United States Patent
Tanaka

(10) Patent No.: US 12,475,203 B2
(45) Date of Patent: Nov. 18, 2025

(54) IMAGE CAPTURING APPARATUS THAT GUARANTEES AUTHENTICITY OF IMAGE DATA, MANAGEMENT SYSTEM, CONTROL METHOD, AND STORAGE MEDIUM

(71) Applicant: CANON KABUSHIKI KAISHA, Tokyo (JP)

(72) Inventor: Keisuke Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 18/524,411

(22) Filed: Nov. 30, 2023

(65) Prior Publication Data

US 2024/0184871 A1 Jun. 6, 2024

(30) Foreign Application Priority Data

Dec. 5, 2022 (JP) .................................. 2022-194155
Oct. 11, 2023 (JP) .................................. 2023-176068

(51) Int. Cl.
*G06F 21/32* (2013.01)
*G06V 40/10* (2022.01)
(Continued)

(52) U.S. Cl.
CPC .............. *G06F 21/32* (2013.01); *G06V 40/10* (2022.01); *H04L 9/3231* (2013.01); *H04L 9/50* (2022.05)

(58) Field of Classification Search
CPC ....... G06F 21/32; G06V 40/10; H04L 9/3231; H04L 9/50
See application file for complete search history.

(56) References Cited

U.S. PATENT DOCUMENTS

| | | | | |
|---|---|---|---|---|
| 7,386,603 B2 * | 6/2008 | Shiba | ..................... | G06Q 30/02 709/219 |
| 11,843,751 B2 * | 12/2023 | Kamekawa | ........... | G06F 3/1238 |

(Continued)

FOREIGN PATENT DOCUMENTS

| | | | | |
|---|---|---|---|---|
| CN | 110401542 A | * | 11/2019 | ......... H04L 63/0861 |
| JP | 2016051482 A | * | 4/2016 | ............. G06V 10/17 |

(Continued)

OTHER PUBLICATIONS

U.S. Appl. No. 18/525,188, filed Nov. 30, 2023 by Daiyu Ueno.

*Primary Examiner* — John B King
(74) *Attorney, Agent, or Firm* — VENABLE LLP

(57) ABSTRACT

An image capturing apparatus capable of guaranteeing the authenticity of a person existing in an image as an object. The image capturing apparatus has an image capturing section that captures an image of an object to generate an image data item. A biometric information acquisition section detects biometric information of the object. A biometric authentication section acquires a biometric authentication result indicating whether or not the detected biometric information matches registered biometric information registered in advance. A hash value generation section generates a hash value from the image data item in a case where the biometric authentication result indicates that the biometric information and the registered biometric information match. The hash value and the image data are recorded in a recording medium. When the image of the object is captured by the image capturing section, biometric information of the object is detected.

20 Claims, 15 Drawing Sheets

(51) Int. Cl.
*H04L 9/00* (2022.01)
*H04L 9/32* (2006.01)

(56) References Cited

U.S. PATENT DOCUMENTS

| | | | | |
|---|---|---|---|---|
| 12,047,511 | B2* | 7/2024 | Sakaitani | H04L 9/3239 |
| 2007/0180263 | A1* | 8/2007 | Delgrosso | G06F 21/32 |
| | | | | 713/186 |
| 2010/0142764 | A1* | 6/2010 | Ikegami | G06V 40/50 |
| | | | | 713/168 |
| 2014/0294250 | A1* | 10/2014 | Aoki | G06V 40/10 |
| | | | | 382/167 |
| 2017/0206523 | A1* | 7/2017 | Goeringer | G06Q 20/409 |
| 2017/0257358 | A1* | 9/2017 | Ebrahimi | H04L 9/3236 |
| 2019/0050805 | A1* | 2/2019 | Munafo | G08G 5/26 |
| 2019/0372781 | A1* | 12/2019 | Ra | H04L 9/3239 |
| 2020/0092102 | A1* | 3/2020 | Wang | H04L 63/0861 |
| 2020/0145219 | A1* | 5/2020 | Sebastian | H04L 9/50 |
| 2020/0244649 | A1* | 7/2020 | Zou | H04L 9/3239 |
| 2020/0320679 | A1* | 10/2020 | McGregor | G06F 16/5866 |
| 2023/0216682 | A1* | 7/2023 | Lipton | G06Q 30/018 |
| | | | | 713/172 |
| 2024/0070250 | A1* | 2/2024 | Tsuchida | H04L 9/3239 |
| 2024/0205033 | A1* | 6/2024 | Ueno | H04L 9/50 |

FOREIGN PATENT DOCUMENTS

| | | | | | |
|---|---|---|---|---|---|
| JP | 2017-204706 | A | | 11/2017 | |
| JP | 2022189730 | A | * | 12/2022 | |
| JP | 2024033520 | A | * | 3/2024 | G06V 40/00 |

* cited by examiner

*FIG. 4A*                *FIG. 4B*
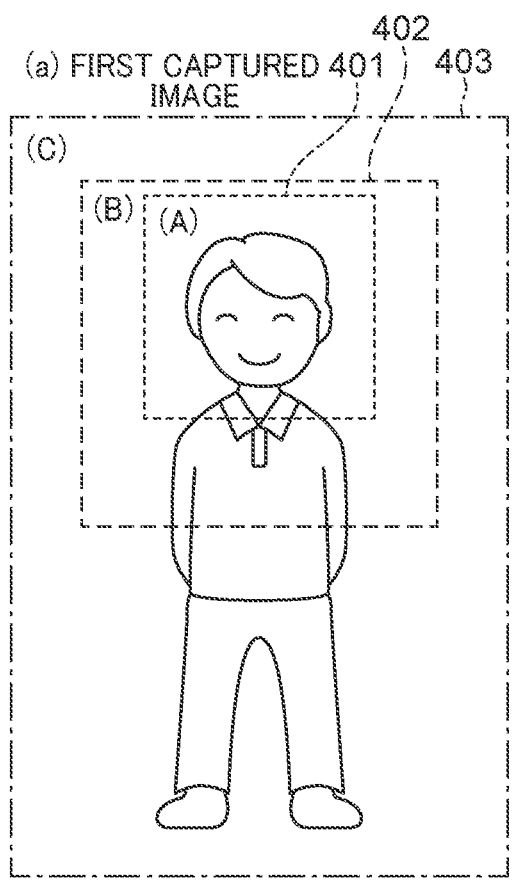
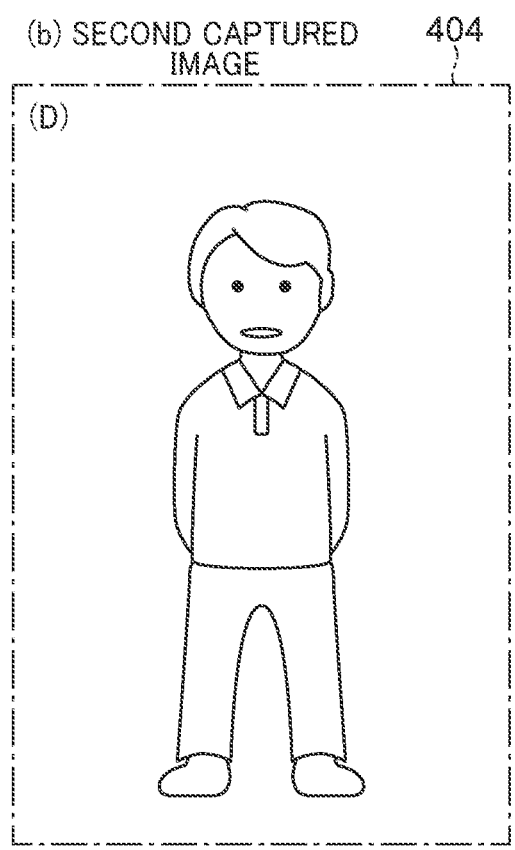

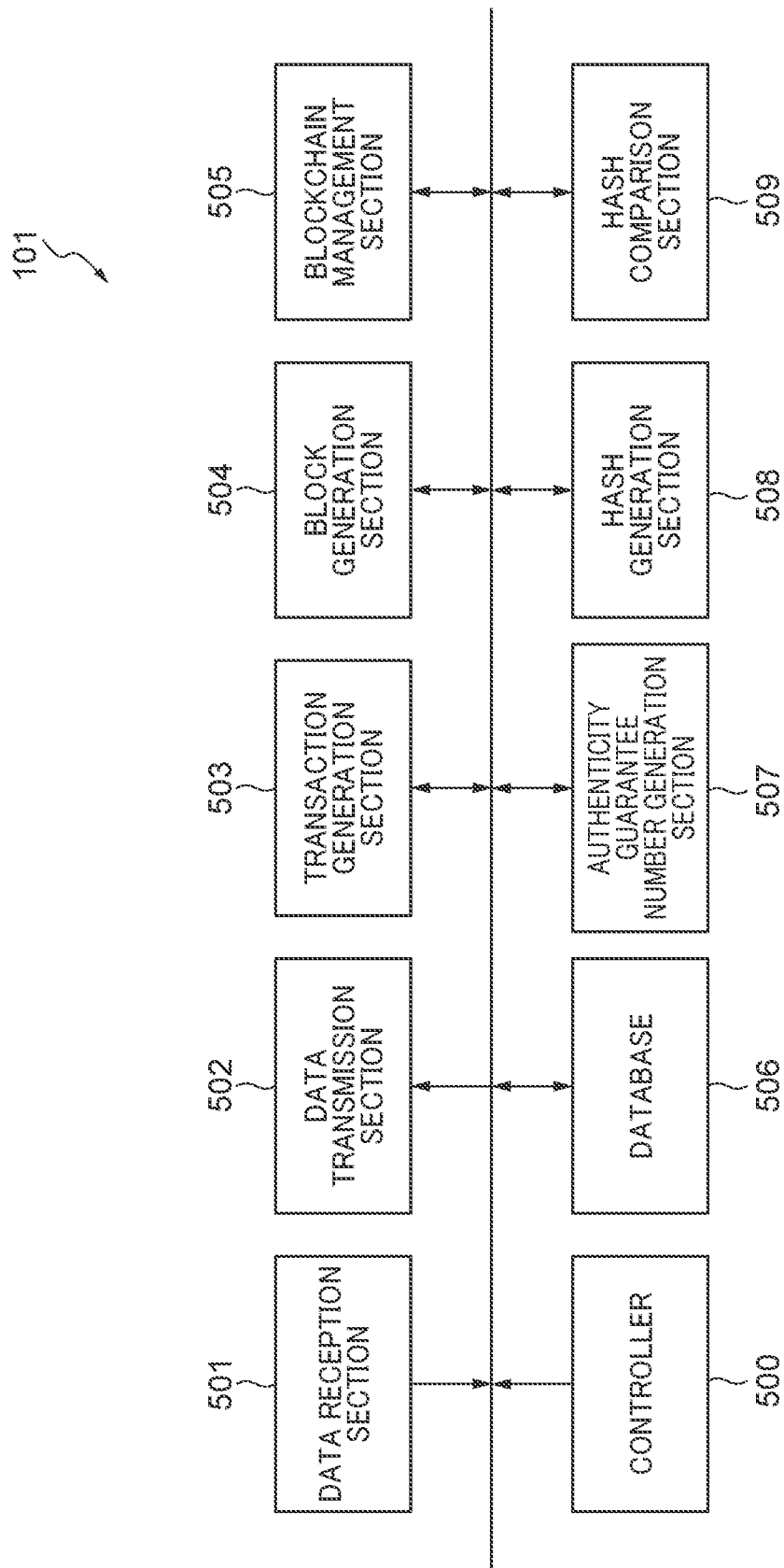

*FIG. 6*

| ID | BLOCK ID | IMAGE DATA | BIOMETRIC AUTHENTICATION RESULT INFORMATION |
|---|---|---|---|
| 0 | xxx...xxx | IMG_0000.JPG | MATCH (PERSONAL MANAGEMENT NUMBER ******) |
| 1 | xxx...xxx | IMG_0001.JPG | MATCH (PERSONAL MANAGEMENT NUMBER ******) |
| 2 | xxx...xxx | IMG_0002.JPG | MATCH (PERSONAL MANAGEMENT NUMBER ******) |
| 3 | xxx...xxx | IMG_0003.JPG | MISMATCH (NOT PERSONAL MANAGEMENT NUMBER ******) |

FIG. 15

| 1501 | 1502 | 1503 | 1504 | 1505 | 1506 | 1507 |
|---|---|---|---|---|---|---|
| ID | BLOCK ID | IMAGE DATA | BIOMETRIC AUTHENTICATION RESULT INFORMATION | IMAGE ACQUISITION DATE | IMAGE DATA SIZE | VALIDITY FLAG |
| 0 | xxx... xxx | IMG_0000.JPG | MATCH (PERSONAL MANAGEMENT NUMBER ******) | SEPTEMBER 2, 2022 | 10.5M | VALID |
| 1 | xxx... xxx | IMG_0001.JPG | MATCH (PERSONAL MANAGEMENT NUMBER ******) | SEPTEMBER 2, 2022 | 9.4MB | VALID |
| 2 | xxx... xxx | IMG_0002.JPG | MATCH (PERSONAL MANAGEMENT NUMBER ******) | MARCH 1, 2022 | 9.2MB | VALID |
| 3 | xxx... xxx | IMG_0003.JPG | MATCH (PERSONAL MANAGEMENT NUMBER ******) | MARCH 1, 2022 | 5.6MB | INVALID |
| 4 | xxx... xxx | IMG_0004.JPG | MATCH (PERSONAL MANAGEMENT NUMBER ******) | JANUARY 28, 2022 | 8.3MB | INVALID |
| 5 | xxx... xxx | IMG_0005.JPG | MISMATCH (NOT PERSONAL MANAGEMENT NUMBER ******) | JANUARY 28, 2022 | 9.2MB | INVALID |

1500

IMAGE CAPTURING APPARATUS THAT GUARANTEES AUTHENTICITY OF IMAGE DATA, MANAGEMENT SYSTEM, CONTROL METHOD, AND STORAGE MEDIUM

BACKGROUND OF THE INVENTION

Field of the Invention

The present invention relates to an image capturing apparatus, a management system, a control method, and a storage medium, and more particularly to an image capturing apparatus that guarantees authenticity of digital image data, a management system, a control method, and a storage medium.

Description of the Related Art

In recent years, information sharing via the Internet and the SNS is increasingly becoming more active, and we are in an age where everyone can view and transmit information. Under such circumstances, a technique for altering digital image data has been further developed, and hence it has become difficult for a user viewing information to confirm the authenticity of viewed contents, and a problem, such as fake news, has become serious. To cope with such a problem, there is an increasing demand for a mechanism that guarantees the authenticity of digital image data (no alteration or tampering).

It is under consideration to use, as the mechanism that guarantees the authenticity of digital image data, a blockchain technique which is widely used in industries, such as a financial service. The blockchain technique can prevent tampering of digital data at low costs in a decentralized fashion. For example, there is known a management system using the blockchain technique, that registers a hash value of contents and metadata associated with the contents in a blockchain and guarantees the authenticity of the contents from the time of generation thereof (see e.g. Japanese Laid-Open Patent Publication (Kokai) No. 2017-204706). By using this management system, it is possible to disclose the contents which have not been altered since the time of generation thereof e.g. via the Internet and the SNS.

However, in the management system disclosed in Japanese Laid-Open Patent Publication (Kokai) No. 2017-204706, in a case where the contents of an image include a specific person, no means for guaranteeing the authenticity of the person existing in the image is described, and there is a room for further improvement.

SUMMARY OF THE INVENTION

The present invention provides an image capturing apparatus that is capable of guaranteeing the authenticity of a person existing in an image as an object, a management system, a control method, and a storage medium.

In a first aspect of the present invention, there is provided an image capturing apparatus that has an image capturing section that captures an image of an object to generate an image data item, including a detection unit configured to detect biometric information of the object, an acquisition unit configured to acquire a biometric authentication result indicating whether or not the detected biometric information matches registered biometric information registered in advance, a hash value generation unit configured to generate a hash value from the image data item in a case where the biometric authentication result indicates that the biometric information and the registered biometric information match, and a recording control unit configured to perform control to record the hash value and the image data item in a recording medium, wherein when the image of the object is captured by the image capturing section, biometric information of the object is detected.

In a second aspect of the present invention, there is provided a management system that is connected to an image capturing apparatus and a network of a blockchain, the image capturing apparatus including an image capturing section configured to capture an image of an object to generate an image data item, a detection section configured to detect biometric information of the object, an acquisition section configured to acquire a biometric authentication result indicating whether or not the detected biometric information matches registered biometric information registered in advance, a hash value generation section configured to generate a hash value from the image data item in a case where the biometric authentication result indicates that the biometric information and the registered biometric information match, and a transmission section configured to transmit the hash value and the image data item to the management system, wherein when the image of the object is captured by the image capturing section, biometric information of the object is detected, the management system including a reception unit configured to receive the hash value and the image data item, and a registration unit configured to register the hash value in the blockchain.

According to the present invention, it is possible to guarantee the authenticity of a person existing in an image as an object.

Further features of the present invention will become apparent from the following description of exemplary embodiments (with reference to the attached drawings).

BRIEF DESCRIPTION OF THE DRAWINGS

FIGS. 4A and 4B are diagrams showing examples of image data items and trimmed image data items generated in a step in FIG. 3.

FIG. 5 is a schematic block diagram showing a software configuration of a management system according to the embodiment of the present invention.

FIG. 6 is a diagram showing an example of the configuration of a database appearing in FIG. 5.

FIG. 15 is a diagram showing an example of the configuration of a database managed by the management system appearing in FIG. 2.

DESCRIPTION OF THE EMBODIMENTS

The present invention will now be described in detail below with reference to the accompanying drawings showing embodiments thereof. However, the embodiments of the present invention are not limited to the following contents.

First, a method of guaranteeing the authenticity of contents included in an image by using a management system 101 according to an embodiment of the present invention will be described with reference to FIG. 11.

Figure 11:
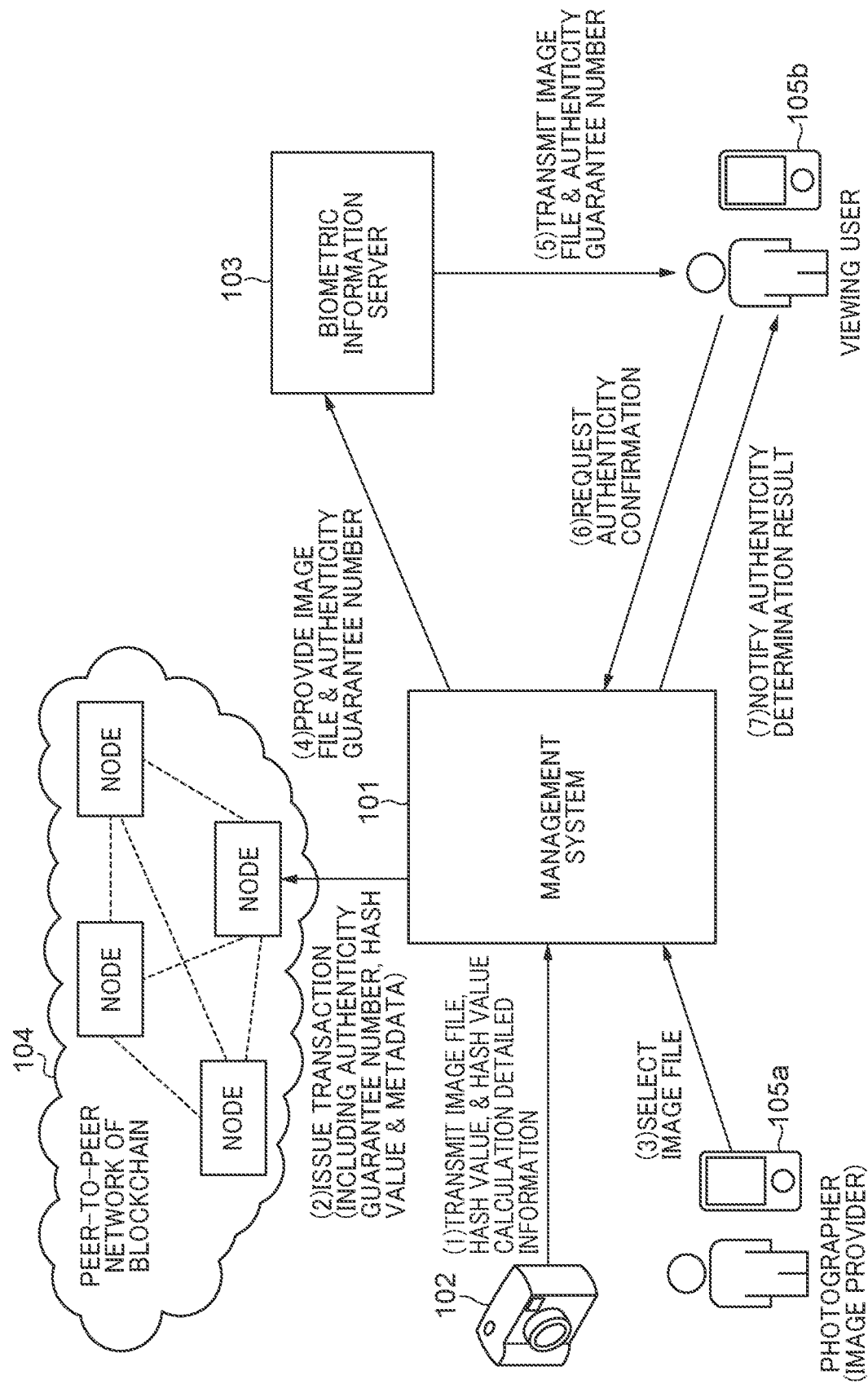
FIG. 11 is a diagram useful in explaining a method of guaranteeing the authenticity of contents included in an image using the management system shown in FIG. 5.

Referring to FIG. 11, the management system 101 has the function of managing contents acquired from an external apparatus, such as an image capturing apparatus 102, via the Internet and the like. The management system 101 is realized by one or more computer apparatuses. Note that although in the present embodiment, a description will be given of a configuration in which the management system 101 further communicates with a peer-to-peer network 104 of a blockchain to use the blockchain, this is not limitative, but the management system 101 may be realized by using any suitable one of other networks.

As shown in FIG. 11, when the image capturing apparatus 102 performs a photographing operation, the image capturing apparatus 102 transmits an image file obtained through this photographing operation, a hash value (image hash value), and hash value calculation detailed information in a state associated with each other, to the management system 101 (step (1)). The image file includes image data and metadata. Further, the image data is still image data or moving image data. The metadata includes not only attribute information of the image data, which indicates a photographer of the image data, a photographing time, a photographing place, a model of the image capturing apparatus, settings of the image capturing apparatus at the photographing time, but also a biometric authentication result, described hereinafter. The hash value is a value obtained by applying a hash function to the image file in a state at the time of generation thereof.

The hash value calculation detailed information describes, in a case where image data included in an image file is thinned and a hash function is applied to the thinned image data, information indicating how the image data is thinned. Note that as the algorithm of the hash function to be used, only an initially set algorithm may be used, or one of a plurality of algorithms, such as SHA256 and MD5, may be selected. In the latter case, an algorithm used for hash value calculation is also described in the hash value calculation detailed information. For example, the SHA256 used for hashing image data is an algorithm in which calculation is repeatedly performed on the image data on a 64 bytes basis from the top of the data to the end of the data, to thereby generate a hash value of 32 bytes (256 bits). If from the top of the image data, an operation of using 64 bytes for calculation and skipping the next 64 bytes without using them for calculation is repeatedly performed on the entirety of the image data, the calculation amount is reduced to half. The hash value calculation detailed information in this case can be described e.g. as "Algorithm, SHA256, Read, 64, Skip, 64" by using the CSV file format. Further, in a case where the image data is moving image data, the hash function can be applied to every other frame thereof. The hash value calculation detailed information in this case can be described e.g. as "Algorithm, SHA256, SkipFrame, 1," by using the CSV file format. Further, in combination with this, it is possible to thin data in each frame without using all of the data in the frame. The hash value calculation detailed information in this case can be described as "Algorithm, SHA256, SkipFrame, 1, Read, 64, Skip, 64" by using the CSV file format.

Note that the format of the hash value calculation detailed information is not limited to the CSV file format. For example, the hash value calculation detailed information may be described in a file format which is widely used, such as the JSON file format, or may be described in a custom file format.

Note that although in the present embodiment, the description is given of the configuration in which the image capturing apparatus 102 generates a hash value and transmits the generated hash value to the management system 101, this is not limitative, but for example, the management system 101 may generate a hash value based on an image file acquired from the image capturing apparatus 102.

Upon receipt of the image file, the hash value, and the hash value calculation detailed information from the image capturing apparatus 102, the management system 101 (authenticity guarantee number generation unit) according to the present embodiment generates an authenticity guarantee number which is a unique number in the management system 101. The authenticity guarantee number is an identification number for uniquely identifying the image file.

The management system 101 generates transaction data including the metadata, the hash value, the hash value calculation detailed information, and the authenticity guarantee number, and connects a block in which the generated transaction data has been written, to the blockchain. Specifically, the management system 101 issues the generated transaction data to broadcast the transaction data to one or more computers (nodes) participating in the peer-to-peer network 104 of the blockchain (step (2)). With this, the transaction data is temporarily stored in a transaction pool, and when the transaction data is approved by miners, verification is completed. Then, a block in which the transaction data has been written is generated and is added to the end of the blockchain.

After connecting the block in which the transaction data has been written to the blockchain, the management system 101 stores (provides) the image file and the authenticity guarantee number in a state associated with each other, in a database 506, described hereinafter with reference to FIG. 5.

Then, the management system 101 causes a user (such as a photographer or an image provider) to select an image file to be transmitted to a biometric information server 103, from a plurality of image files registered in the database 506 (step (3)). Specifically, the user can access a WEB page of the management system 101 from a communication apparatus 105a operated by the user and select the image file to be registered in the biometric information server 103 from the WEB page. The management system 101 provides the image file selected by the user and the authenticity guarantee number associated with the selected image file to the biometric information server 103 (step (4)). The management system 101 notifies the communication apparatus 105*a* that the image file selected by the user in the step (3) has been registered in the biometric information server 103, at the same time.

The biometric information server 103 controls the display on the WEB page thereof such that the authenticity guarantee number provided from the management system 101 together with the image file is displayed, e.g. in the vicinity of the image file. Note that the above-mentioned display position of the authenticity guarantee number is an example, and the authenticity guarantee number is only required to be displayed in a position where a viewing user of the biometric information server 103 can recognize that it is the authenticity guarantee number associated with the image file.

There is a case where a viewing user of the biometric information server 103 desires to confirm that an image file displayed on the WEB page of the biometric information server 103 has not been altered (tampered) from the time when the image was photographed. In this case, first, the viewing user acquires (downloads) the image file and the authenticity guarantee number associated with this image file from the biometric information server 103, using a communication apparatus 105*b* (step (5)). Specifically, the viewing user accesses the WEB page of the biometric information server 103 from the communication apparatus 105*b*, selects an image file disclosed on the WEB page, and instructs download thereof. Upon receipt of this instruction, the biometric information server 103 transmits the selected image file and the authenticity guarantee number to the communication apparatus 105*b*.

When the download is completed, the communication apparatus 105*b* transmits a request for confirming the authenticity of the selected image file to the management system 101 together with the acquired image file and authenticity guarantee number (step (6)). In the present embodiment, the authenticity confirmation request is performed by attaching the image file and the authenticity guarantee number, which have been acquired from the biometric information server 103, to an entry form provided by the management system 101, by using the communication apparatus 105*b*. However, the method of the authenticity confirmation request is not limited to the method used in the present embodiment, but, for example, the authenticity confirmation request may be performed by transmitting an email to which the image file and the authenticity guarantee number are attached, to the management system 101.

When the authenticity confirmation request is transmitted from the communication apparatus 105*b*, the management system 101 performs determination of the authenticity of the image file of which is the authenticity is requested to be confirmed. Note that although in this example, the authenticity determination is performed when the management system 101 receives the authenticity confirmation request with respect to the image data displayed on the biometric information server 103 from the communication apparatus 105*b* of the viewing user of the biometric information server 103, this is not limitative. For example, the management system 101 may periodically perform the authenticity determination based on the database 506. The management system 101 displays a result of the authenticity determination on the WEB page of the management system 101 or notifies the communication apparatus 105*b* of the result using an email.

Figure 1:
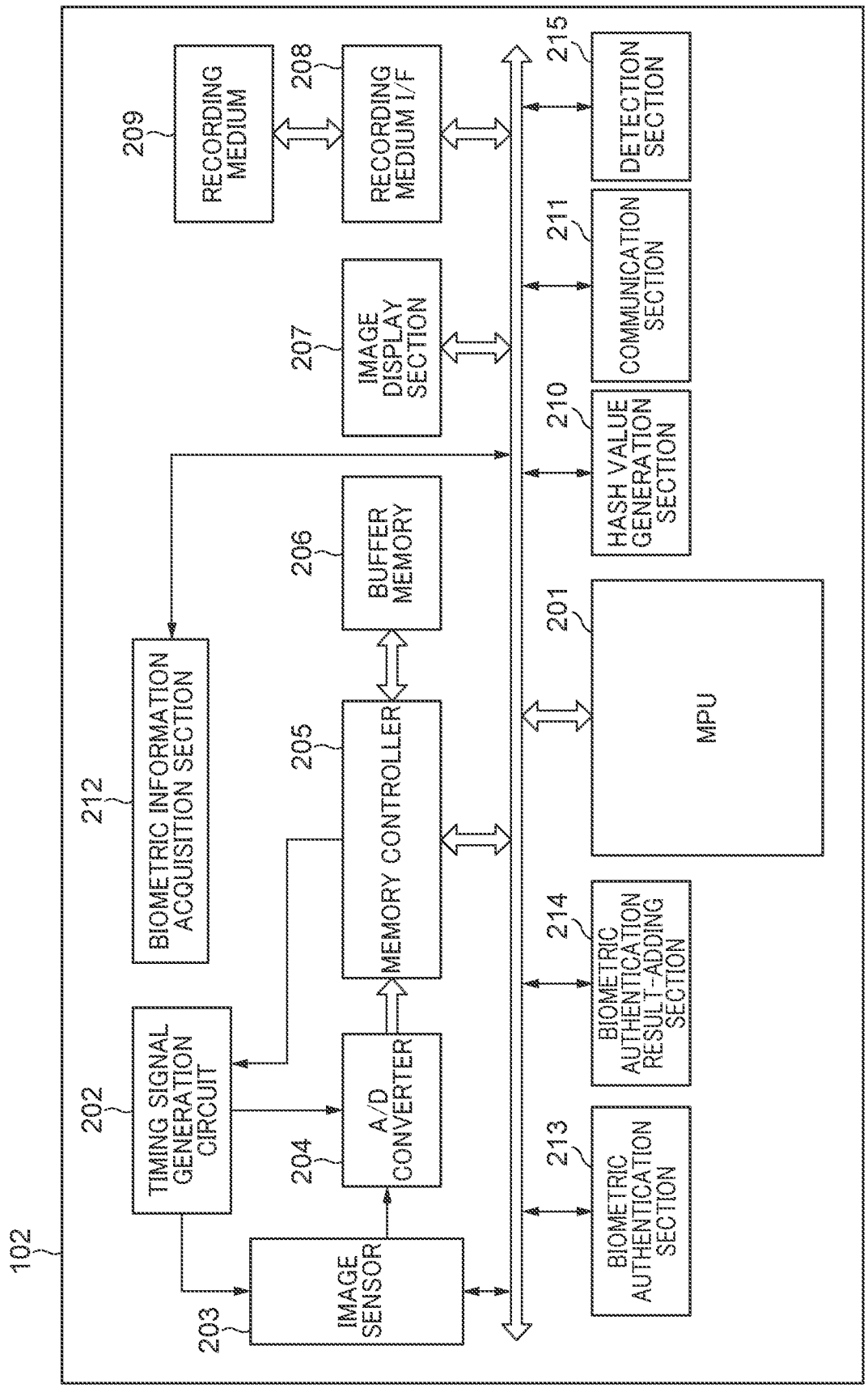
FIG. 1 is a schematic block diagram showing a hardware configuration of an image capturing apparatus according to a first embodiment of the present invention.

FIG. 1 is a schematic block diagram showing a hardware configuration of the image capturing apparatus 102.

The image capturing apparatus 102 is a camera, such as a digital camera or a digital video camera, or an electronic device equipped with a camera function, such as a mobile phone equipped with the camera function or a computer with a camera. Referring to FIG. 1, the image capturing apparatus 102 includes an MPU 201, a timing signal generation circuit 202, an image sensor 203, an analog-to-digital converter 204, a memory controller 205, and a buffer memory 206. Further, the image capturing apparatus 102 includes an image display section 207, a recording medium interface 208, a recording medium 209, a hash value generation section 210, a communication section 211, a biometric information acquisition section 212, and a detection section 215. The biometric information acquisition section 212 is included in the image capturing apparatus 102, in a state configured to be suitable to biometric information to be acquired. Further, although in the present invention, the description is given of the configuration in which a biometric authentication section 213 and a biometric authentication result-adding section 214 are included in the image capturing apparatus 102 by way of example, these components may be included in the management system 101.

The MPU 201 is a micro controller for performing control on the system of the image capturing apparatus 102, such as control of a photographing sequence. The MPU 201 also controls authentication of biometric information and addition of authentication result information to metadata included in an image file.

The timing signal generation circuit 202 generates a timing signal necessary for operating the image sensor 203.

The image sensor 203 (image capturing section) is a CCD or CMOS sensor that converts light reflected from an object to electrical signals (analog image data). The analog-to-digital converter 204 converts the analog image data read out from the image sensor 203 to digital image data.

The memory controller 205 controls reading and writing of e.g. image data and a biometric authentication result from and into the buffer memory 206, a refresh operation of the buffer memory 206, and so forth. The buffer memory 206 stores the image data. The image display section 207 displays the image data stored in the buffer memory 206, an inquiry screen to a user, and so forth.

The detection section 215 detects an object from the image data stored in the buffer memory 206.

The recording medium interface 208 is for controlling reading and writing of data from and into the recording medium 209. The recording medium 209 is a memory card, a hard disk, or the like, and stores programs, and the like.

The hash value generation section 210 (hash value generation unit/hash value generation section) applies a hash function to the image data (binary data) stored in the buffer memory 206 to generate a hash value. Further, the hash value generation section 210 also generates hash value calculation detailed information. Note that not the hash value generation section 210, but the MPU 201 may generate a hash value.

The communication section 211 is connected to the Internet and transmits and receives data to and from an external apparatus.

The biometric information acquisition section 212 (detection unit/detection section) detects and acquires biometric information from an object.

The biometric authentication section 213 (acquisition unit/acquisition section) performs biometric authentication for authenticating whether or not biometric information acquired by the biometric information acquisition section 212 matches biometric information registered in the external biometric information server 103, described hereinafter, in advance, and acquires a result of the biometric authentication. In the present embodiment, the biometric information acquired by the biometric information acquisition section 212 is sent to the biometric authentication section 213 via the memory controller 205 and the MPU 201, and the biometric authentication is performed on this biometric information by the biometric information server 103. Note that although in the present embodiment, the biometric information of an object has been registered in the biometric information server 103 in advance, means for registering the biometric information in advance is not limited to this. For example, the biometric information may be registered in the biometric authentication section 213 included in the image capturing apparatus 102 in advance or data acquired by an external biometric authentication acquisition device may be stored in the image capturing apparatus 102. In such a case, the biometric authentication is performed by the image capturing apparatus 102.

The biometric authentication result-adding section 214 receives the biometric authentication result generated by the biometric authentication section 213 via the MPU 201 and adds the received biometric authentication result to metadata of image data. Note that the biometric authentication result is not limited to this insofar as it is added to image data of an object on which the biometric authentication is performed, and is transmitted to the management system 101, but may be treated as information separate from image data.

Hereafter, a data transmission process performed by the image capturing apparatus 102 will be described with reference to a schematic explanatory diagram in FIG. 2 and a flowchart in FIG. 3.

The data transmission process is realized by the MPU 201 of the image capturing apparatus 102, which executes a program stored e.g. in the recording medium 209. Further, the present process is executed when the image capturing apparatus 102 receives a photographing start operation performed by a photographer, such as an operation of pressing a photographing button, not shown, of the image capturing apparatus 102.

Figure 2:
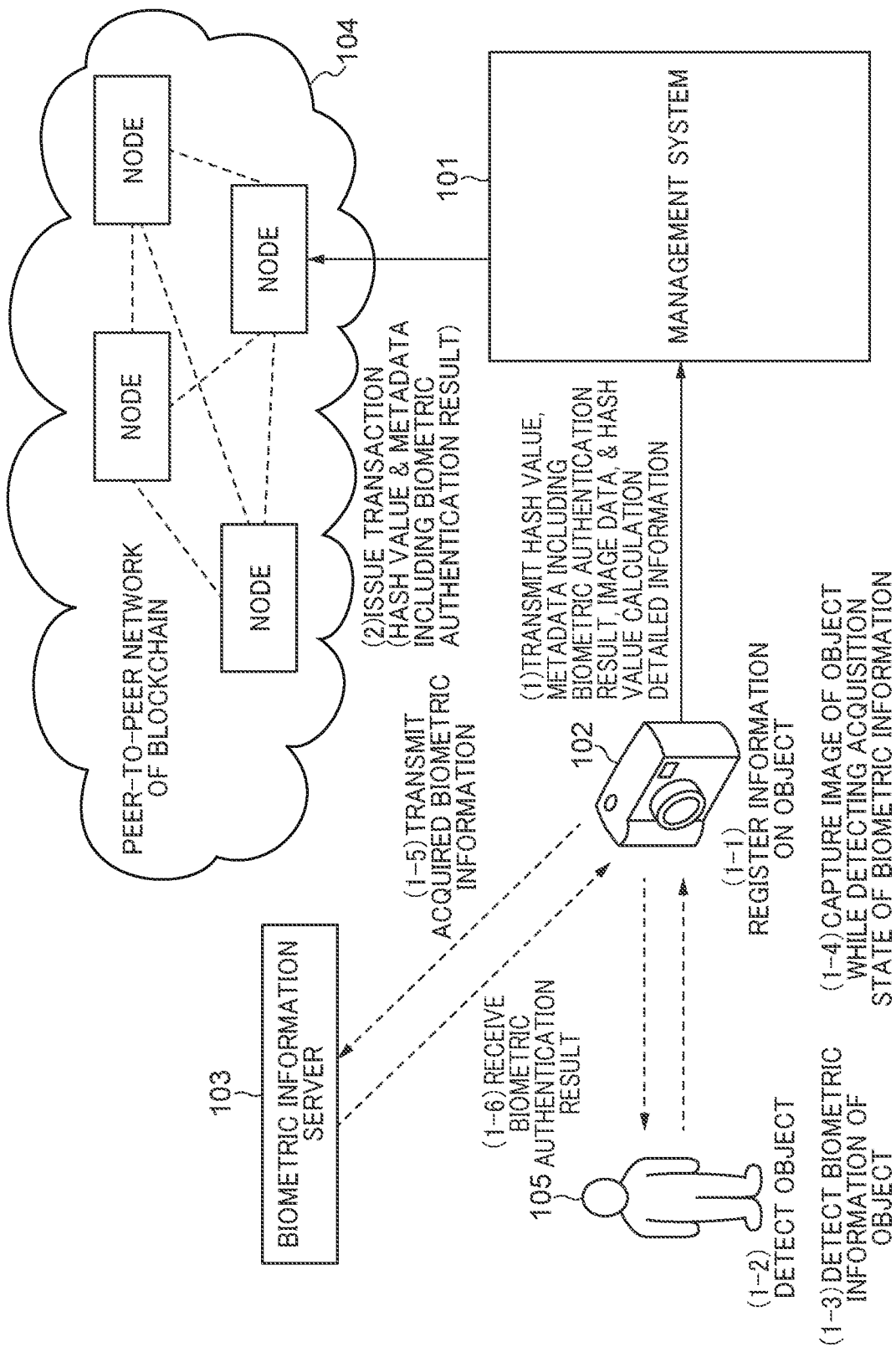
FIG. 2 is a schematic diagram useful in explaining a data transmission process performed by the image capturing apparatus shown in FIG. 1.
Figure 3:
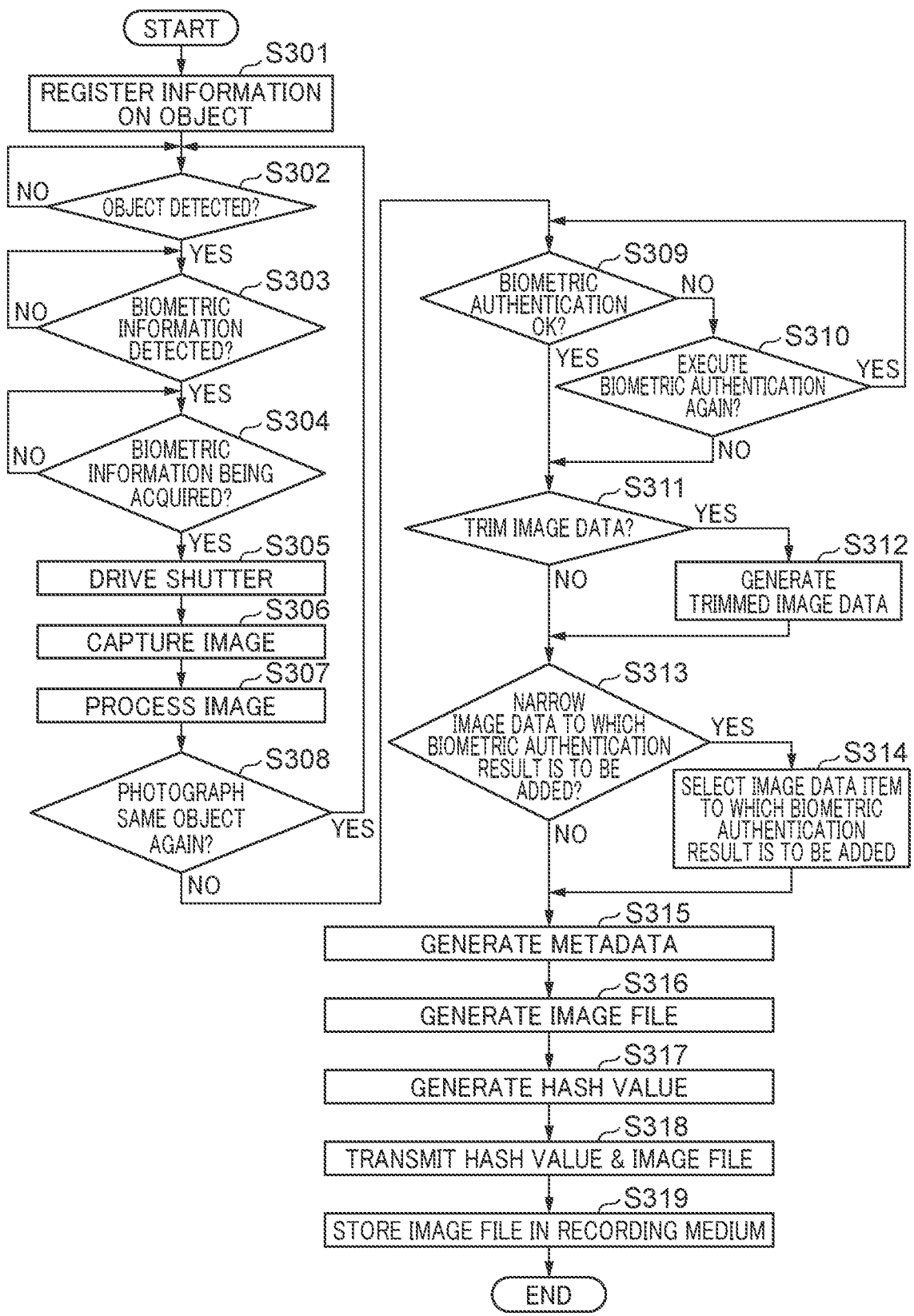
FIG. 3 is a flowchart of the data transmission process performed by the image capturing apparatus shown in FIG. 1.

First, in a step S301, the MPU 201 registers information on an object 105 to be photographed (object information) in the image capturing apparatus 102 (1-1 in FIG. 2). The object information may be any type of information insofar as it enables identification of an individual, such as a name, a date of birth, or an individual number (personal management number), and the input method may be a method of directly and manually inputting the object information to the image capturing apparatus 102 or a method using means for obtaining the object information e.g. by communication with the outside.

Next, in a step S302, the MPU 201 controls the detection section 215 to detect the object 105 (1-2 in FIG. 2). Then, when the object 105 is detected (YES to the step S302), in a step S303, the MPU 201 controls the biometric information acquisition section 212 to start detection of biometric information of the object 105 (1-3 in FIG. 2), and when the biometric information is detected (YES to the step S303), the MPU 201 proceeds to a step S304. The biometric information acquisition section 212 sends a notification to the effect that acquisition of biometric information is in progress to the MPU 201 while the biometric information acquisition section 212 is detecting the biometric information.

Then, the MPU 201 determines that acquisition of biometric information is in progress while the above-mentioned notification is being received from the biometric information acquisition section 212 (YES to the step S304), proceeds to a step S305, and drives a shutter (not shown) to control the exposure time of the image sensor 203.

Then, in a step S306, the MPU 201 performs image capturing processing in which light from the object, received by the image sensor 203, is converted to electrical signals (1-4 in FIG. 2).

Then, in a step S307, the MPU 201 performs image processing, such as development and encoding, on the data obtained by the above-mentioned image capturing processing to thereby generate image data. The image data mentioned here refers to still image data or moving image data. Further, the image data generated in this step is stored in the buffer memory 206.

After that, in a step S308, the MPU 201 displays an inquiry screen on the image display section 207 to inquire the user about whether or not to photograph the same object again. After that, the MPU 201 determines whether or not to photograph the same object again according to the user operation input to this inquiry screen.

If it is determined to photograph the same object again (YES to the step S308), the MPU 201 executes the steps S302 to S304 again. As a result of these steps, if it is determined that acquisition of biometric information is in progress (YES to the step S304), the MPU 201 drives the shutter again to perform image capturing processing while continuing the detection state. On the other hand, if it is determined not to photograph the same object any more (NO to the step S308), the MPU 201 proceeds to a step S309.

In the step S309, the MPU 201 performs biometric authentication on the object 105 and determines whether or not the biometric authentication is successful. Specifically, the MPU 201 (second transmission unit) controls the biometric authentication section 213 to transmit the object information registered in the step S301 and the biometric information detected in the step S303 to the biometric information server 103. With this, the biometric authentication section 213 requests the biometric information server 103 to perform biometric authentication on the object 105 (1-5 in FIG. 2). Upon receipt of this request, the biometric information server 103 determines whether or not the biometric information detected in the step S303 matches the biometric information of the object 105, registered in the biometric information server 103. If there is a match between them, it is determined that the biometric authentication on the object 105 is successful, whereas if there is no match between them, it is determined that the biometric authentication on the object 105 has failed. This determination result (biometric authentication result) is transmitted from the biometric information server 103 to the image capturing apparatus 102 (biometric authentication section 213) as a response (1-6 in FIG. 2). Note that the biometric authentication may be performed not by the biometric information server 103, but by the biometric authentication section 213 of the image capturing apparatus 102 using the biometric information (registered biometric information) registered in advance e.g. in the recording medium 209 of the image capturing apparatus 102.

If the biometric authentication section 213 receives (acquires) a determination result to the effect that the biometric authentication is successful from the biometric information server 103 (YES to the step S309), the MPU 201 proceeds to a step S311.

Then, in the step S311, the MPU 201 displays an inquiry screen on the image display section 207 to inquire the user about whether or not to trim the image data stored in the buffer memory 206 in the step S307. Then, the MPU 201 determines whether or not to trim the image data according to a user operation input to this inquiry screen.

If it is determined to trim the image data (YES to the step S311), the MPU 201 (trimming unit) proceeds to a step S312 to generate one or more trimmed image data items and store them in the buffer memory 206, and then proceeds to a step S313. For example, as the trimmed image data, image data items (A) to (C) (see FIG. 4A) are generated by trimming the image data obtained through first photographing into image data items of respective areas for associated uses, such as a head-shot area 401, an upper body-shot area 402, and a full body-shot area 403. In the present embodiment, as shown in FIGS. 4A and 4B, image data items (A) to (C), which have been trimmed from image data obtained by first photographing, and an image data item (D) obtained by second photographing, which has not been trimmed, are stored in the buffer memory 206. The biometric authentication result can be added to such trimmed image data items, and this is preferable because the biometric authentication result becomes easy to use for a fixed use (format), such as digital certificate photo. On the other hand, if it is determined not to trim the image data (NO to the step S311), the MPU 201 directly proceeds to the step S313.

On the other hand, if a determination result to the effect that the biometric authentication has failed is received from the biometric information server 103 (NO to the step S309), the MPU 201 proceeds to a step S310.

In the step S310, the MPU 201 displays an inquiry screen on the image display section 207 to inquire the user about whether or not the user desires to perform the biometric authentication again. After that, the MPU 201 determines whether or not to perform the biometric authentication again according to a user operation input to this inquiry screen.

If it is determined to perform the biometric authentication again (YES to the step S310), the MPU 201 returns to the step S309 and performs the biometric authentication again. Note that the MPU 201 may return to the step S303, photograph the object 105 again during detection of the biometric information, and perform the biometric authentication again using the redetected biometric information of the object 105.

On the other hand, if it is determined not to perform the biometric authentication again (NO to the step S310), the MPU 201 proceeds to the step S311. Note that in this case, metadata, described hereinafter in a step S315, may be generated using the result indicating the mismatch as the biometric authentication result. Further, the biometric authentication result may be included in the metadata in this step or may be separately managed.

In the step S313, the MPU 201 displays an inquiry screen on the image display section 207. With this screen, the MPU 201 inquires the user about to which of image data items generated in the steps S307 and S311 the biometric authentication result acquired in one of the steps S309 and S310 is to be added. After that, the MPU 201 determines whether or not to narrow the image data to which the biometric authentication result is to be added (whether or not to selectively add the biometric authentication result) according to a user operation input to this inquiry screen.

If it is determined to selectively add the biometric authentication result (YES to the step S313), the MPU 201 proceeds to a step S314 and displays an inquiry screen on the image display section 207 to cause the user to select an image data item to which the biometric authentication result is to be added. For example, in a case where the user selects the image data items (A) and (B) from the image data items (A) to (D) stored in the buffer memory 206, on this inquiry screen, the MPU 201 adds the biometric authentication result to these image data items (A) and (B). That is, the biometric authentication result is stored in the buffer memory 206 in a state associated with the image data items (A) and (B). On the other hand, the biometric authentication result is not added to the image data items (C) and (D), which have not been selected as the image data items to which the biometric authentication result is to be added. Further, in a case where the user selects "not to selectively add the biometric authentication result" on the inquiry screen displayed in the step S313, the biometric authentication result is added to all of the image data items (A) to (D). That is, the biometric authentication result is stored in the buffer memory 206 in a state associated with all of the image data items (A) to (D). After that, the MPU 201 proceeds to the step S315.

Thus, the biometric authentication result can be added only to selected image data items, and this is preferable from the viewpoint of security because it is possible to guarantee the authenticity of a person only for image data items actually desired to be used.

Next, in the step S315, the MPU 201 generates metadata associated with the image data item(s) to which the biometric authentication result has been added in the step S313 or S314. The metadata generated in this step includes not only attribute information (a photographer, a photographing time, a photographing place, a model of the image capturing apparatus, settings of the image capturing apparatus at the photographing time, and so forth) of image data when the image capturing processing for generating the image data has been performed, but also the biometric authentication result acquired in one of the steps S309 and S310, and so forth.

Then, in a step S316, the MPU 201 adds the metadata generated in the step S315 to the image data (image data item(s)) to which the biometric authentication result has been added to thereby generate an image file of the JPEG format, the MPGE format or the like.

Then, in a step S317, the MPU 201 controls the hash value generation section 210 to apply the hash function to the image data generated in the step S316 to generate a hash value. Then, in a step S318, the MPU 201 (transmission unit/transmission section) transmits the hash value, the image file, and so forth, to the management system 101 and causes the management system 101 to execute a blockchain registration process, described hereinafter with reference to FIG. 7 (step (1) in FIG. 2). As the data transmitted to the management system 101 in this step, not only the hash value and the image file (including the metadata), but also the acquired biometric information data may be transmitted.

Then, in a step S319, the MPU 201 stores the hash value and the image file in the recording medium 209, followed by terminating the present process. In this step, the hash value may be stored in a state stored in a predetermined area of the image file or may be stored separately from the image file in a state associated with the image file.

Note that the data transmitted to the management system 101 in the step S318 may be encoded. Further, the hash value and the image file may be transmitted to the management system 101 in the step S318 only in a case where the biometric authentication is successful, or information indicating whether or not the biometric authentication is successful may be transmitted to the management system 101 together with the hash value and the image file. In the latter case, the determination of whether or not to register the information in the blockchain is performed by the management system 101. From the viewpoint of reducing the processing load of the management system 101 by registering only accurate information, it is more preferable that the hash value and the image file are transmitted to the management system 101 only in a case where the biometric authentication is successful.

Thus, in the present embodiment, when the image capturing apparatus 102 performs a photographing operation, an image file including not only image data but also metadata including a biometric authentication result, and a hash value are immediately transmitted to the management system 101. Further, although in the present embodiment, the description is given of the configuration in which the image capturing apparatus 102 generates a hash value and transmits the data including the generated hash value to the management system 101, this is not limitative, but for example, the management system 101 may acquire an image file from the image capturing apparatus 102 and generate a hash value.

Note that as the method of biometric authentication in the present invention, any type of method can be used insofar as it is a method which can perform personal authentication using biometric information, such as fingerprint authentication, voice authentication (vocal cord authentication), or iris authentication. Further, although it is desirable that a device that performs detection of biometric information is incorporated in the image capturing apparatus 102 from the viewpoint of convenience that photographing and biometric information detection can be performed by one apparatus, this device is not necessarily required to be incorporated in the image capturing apparatus 102. Further, although the number of types of biometric information detected in the step S303 may be one, it is more preferable that a plurality of types of biometric information can be detected from the viewpoint of security.

Next, the detection patterns of biometric information used for the biometric authentication will be described, but the present embodiment is not limited to the following description.

In a case where the vocal cord authentication is used as the biometric authentication, when the object 105 is detected by the detection section 215, the object 105 is caused to utter a voice, and in this state, voice information is acquired by the biometric information acquisition section 212, and the object 105 is photographed by driving the shutter. Then, the MPU 201 performs the biometric authentication (vocal cord authentication) using the voice information acquired from the biometric information acquisition section 212 and generates metadata to which a result of the biometric authentication is added.

In a case where the fingerprint authentication is used as the biometric authentication, when the object 105 is detected by the detection section 215, the object 105 is caused to touch a fingerprint detection section of an external biometric information acquisition device (not shown) which communicates with the image capturing apparatus, with his/her finger. In this state, fingerprint information is acquired from the biometric information acquisition device by the biometric information acquisition section 212, and the object 105 is photographed by driving the shutter. After that, the MPU 201 performs the biometric authentication (fingerprint authentication) using the fingerprint information acquired from the biometric information acquisition section 212 and generates metadata to which a result of the biometric authentication is added. Further, the biometric information acquisition device may be incorporated in the image capturing apparatus 102 as the biometric information acquisition section 212. In this case, after the detection section 215 has detected the object 105, the object 105 is caused to perform a motion, such as a motion of opening his/her hand toward the image capturing apparatus 102. In this state, the image capturing apparatus 102 focuses on a tip of one finger of the object 105, and the biometric information acquisition section 212 acquires the fingerprint information from the obtained live view image. Note that in this case, the object 105 may be caused to pose for photographing a certificate photo immediately after the fingerprint information is acquired, to thereby acquire the image as shown in FIGS. 4A and 4B.

In a case where the iris authentication is used as the biometric authentication, when the object 105 is detected by the detection section 215, the image capturing apparatus 102 focuses on a pupil of the object 105, and the biometric information acquisition section 212 acquires the iris information of the object 105 from the obtained live view image as the biometric information. In this case, immediately after the iris information has been acquired, the image capturing apparatus 102 may focus on the entirety of the object 105, and photograph the object 105 by driving the shutter. After that, the MPU 201 performs the biometric authentication (iris authentication) using the iris information acquired from the biometric information acquisition section 212 and generates metadata to which a result of the biometric authentication is added. Detection of the object 105 and detection (acquisition) of the iris information have common processing (such as processing for focusing on a pupil), and hence it is preferable to use the iris authentication as the biometric authentication of the present invention.

Note that it is more preferable that the biometric information acquisition section 212 acquires the iris information by a method which enables confirmation that the iris information is the biometric information of the detected object 105, so as to more positively guarantee the biometric authentication of the object 105. For example, in the iris authentication, it is preferable to use a method in which, first, the biometric information acquisition section 212 acquires a live view image of the face of the object 105 and then acquires information on the iris from the image of the pupil included in the acquired live view image.

FIG. 5 is a block diagram schematically showing the software configuration of the management system 101 according to the embodiment of the present invention. In the present embodiment, the management system 101 is formed by one or a plurality of computers connected to the network.

Referring to FIG. 5, the management system 101 includes a controller 500, a data reception section 501, a data transmission section 502, a transaction generation section 503, a block generation section 504, and a blockchain management section 505. Further, the management system 101 includes the database 506, an authenticity guarantee number generation section 507, a hash generation section 508, and a hash comparison section 509.

The controller 500 controls the overall operation of the management system 101.

The data reception section 501 receives a variety of data including a result of the biometric authentication from an external apparatus. For example, the data reception section 501 receives a hash value and an image file from the image capturing apparatus 102.

The transaction generation section 503 generates transaction data and broadcasts the generated transaction data to one or more computers (nodes) participating in the peer-topeer network 104 of the blockchain. The transaction data includes a hash value received from the image capturing apparatus 102, and an image file including image data and the metadata of the image data. The biometric authentication result is included in the metadata in the present embodiment but may be included in the transaction data as separate information.

When the broadcasted transaction data is approved by miners to complete the verification, the block generation section 504 generates a block to be connected to the blockchain. The block generation section 504 writes one or more transaction data items into the generated block and connects the generated block to the blockchain.

The blockchain management section 505 manages the blockchain which is also held by one or more computers (nodes) participating in the peer-to-peer network 104 of the blockchain. The management system 101 and the nodes are synchronized with each other such that the blockchain held by each of them always has the same contents.

In the database 506, image data included in an image file and the biometric authenticity result associated with the image data are registered.

The authenticity guarantee number generation section 507 generates, upon reception of a hash value and an image file from the image capturing apparatus 102, an authenticity guarantee number which is a unique number in the management system 101.

The hash generation section 508 applies, when performing the authenticity determination, a hash function to the image file transmitted from the communication apparatus 105b of the user (viewing user) having made the authenticity confirmation request to thereby generate a hash value.

The hash comparison section 509 acquires a block associated with the authenticity guarantee number transmitted from the user having made the authenticity confirmation request, from the blockchain managed by the blockchain management section 505. Then, the hash comparison section 509 acquires a hash value (image hash value) written in the acquired block of the blockchain. The hash comparison section 509 performs the authenticity determination by comparing the hash value acquired from the block and the hash value generated by the hash generation section 508. If these two hash values are the same, the hash comparison section 509 determines that the image file transmitted from the user having made the authenticity confirmation request has not been altered (tampered) from the state at the time of generation thereof (true). On the other hand, if the two hash values are different, the hash comparison section 509 determines that the image file transmitted from the user having made the authenticity confirmation request has been altered from the state at the time of generation thereof (not true/false).

FIG. 6 is a diagram showing an example of the configuration of the database 506 appearing in FIG. 5.

As shown in FIG. 6, the database 506 (management unit) manages an ID 601, a block ID 602, image data 603, biometric authentication result information 604, and so forth in a state associated with one another.

As the ID 601, an ID issued when an image file is stored in the database 506 is set. The block ID 602 is, although described in detail hereinafter, an ID (authenticity guarantee number) issued when a block is registered in the blockchain. As the image data 603, a file name of an image file received by the management system 101 e.g. from the image capturing apparatus 102 is set. As the biometric authentication result information 604, a biometric authentication result ("match" is set in a case where the biometric authentication is successful, and "mismatch" is set in a case where the biometric authentication unsuccessful") and information for identifying an individual, which is obtained from the biometric authentication result (such as a personal management number, a name, or a date of birth) are set. Note that the configuration of the database 506 is not limited to the above-described configuration but may include any other items.

Figure 7:
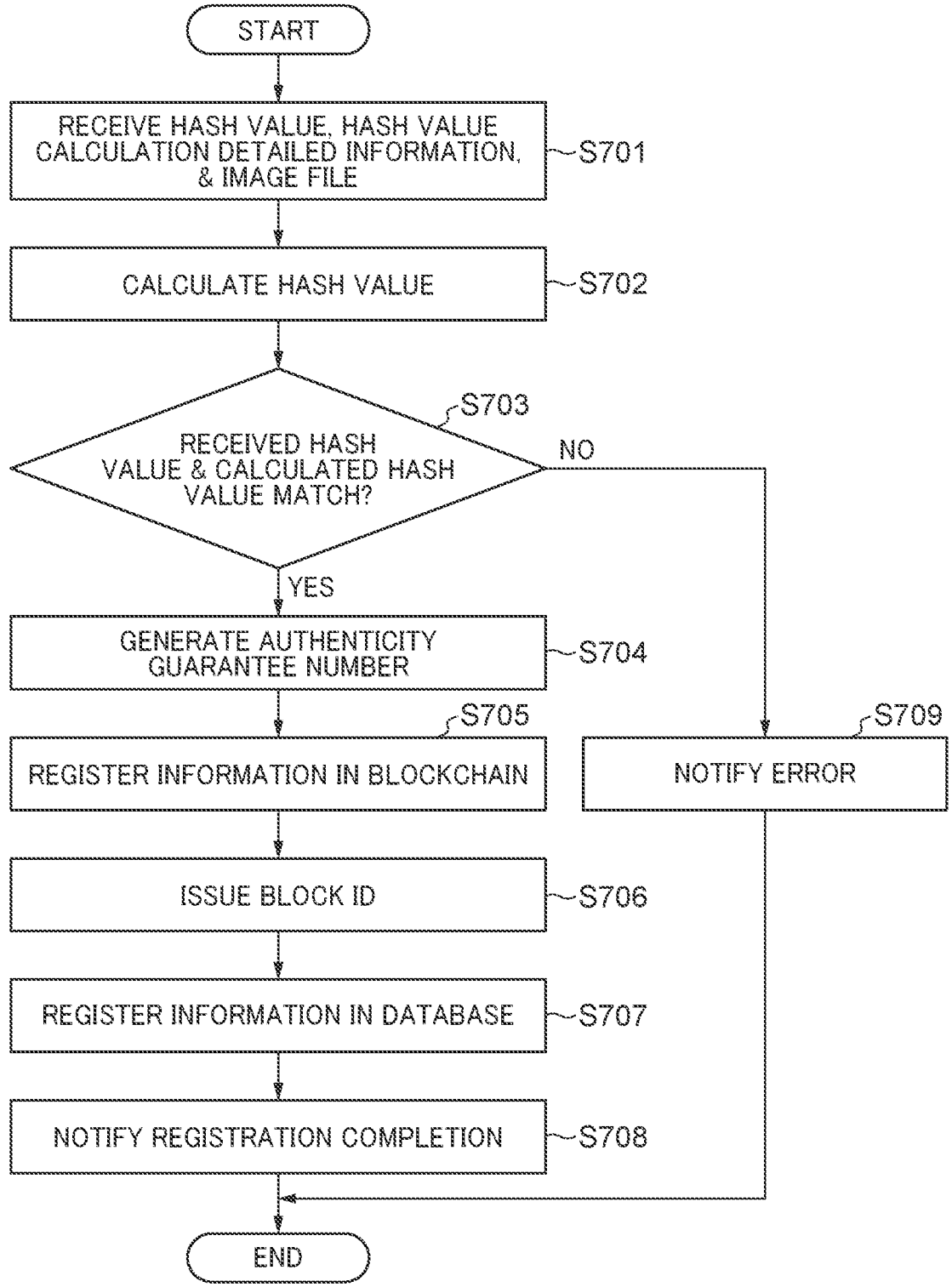
FIG. 7 is a flowchart of a blockchain registration process performed by the management system shown in FIG. 5.

FIG. 7 is a flowchart of the blockchain registration process performed by the management system 101 shown in FIG. 5. The blockchain registration process in FIG. 7 is realized by the controller 500 that executes a program stored in a recording medium included in the computer forming the management system 101. The blockchain registration process in FIG. 7 is executed, for example, when the data transmission process in FIG. 3 is performed by the image capturing apparatus 102, and the hash value and the image file are transmitted from the image capturing apparatus 102 by executing the step S318. Note that in this configuration, the description is given assuming that the biometric authentication result is included in the metadata of the file.

Referring to FIG. 7, the controller 500 (reception unit) receives data formed by the hash value, the hash value calculation detailed information, and the image file from the image capturing apparatus 102 (step S701). In a case where the received data has been encoded, the controller 500 decodes the received data. After that, the controller 500 stores the hash value, the hash value calculation detailed information, and the metadata included in the received image file in the RAM, not shown.

Then, the controller 500 applies thinning processing based on the hash value calculation detailed information to the image file received in the step S701. Then, the controller 500 (second hash value generation unit) calculates a hash value by applying the hash function to the image file after thinning (step S702). Then, the controller 500 determines whether or not the hash value received in the step S701 and the hash value calculated in the step S702 match (step S703).

If it is determined in the step S703 that these hash values match, the process proceeds to a step S704, described hereinafter. If it is determined in the step S703 that these hash values do not match, the process proceeds to a step S709. In the step S709, the controller 500 sends an error notification that the image file cannot be registered in the blockchain to the image capturing apparatus 102. After that, the present process is terminated.

In the step S704, the controller 500 controls the authenticity guarantee number generation section 507 to generate an authenticity guarantee number of the received image file.

Then, the controller 500 (registration unit) registers the authenticity guarantee number generated in the step S704, and the hash value, the hash value calculation detailed information, and the metadata, which are stored in the RAM in the step S701, in the blockchain (step S705). Specifically, first, the transaction generation section 503 generates transaction data including the authenticity guarantee number, the hash value, the hash value calculation detailed information, and the metadata (including the biometric authentication result). Next, the transaction generation section 503 broadcasts the transaction data to one or more computers (nodes) participating in the peer-to-peer network 104 of the blockchain. When the broadcasted transaction data is approved by miners to complete the verification, the block generation section 504 generates a block in which the verified transaction data has been written and connects (registers) the generated block to (in) the blockchain.

Then, the controller 500 (issuing unit) issues a block ID associated with the registered block (step S706). In this step, the controller 500 issues a value generated by applying the hash function twice to the header of the block, as the block ID. Note that although the block ID is used when referring to the block, no field for the block ID is provided in the block.

Then, the controller 500 registers the issued block ID, the image file received in the step S701, and the authenticity guarantee number generated in the step S704, in the database 506 in a state associated with each other (step S707). Then, the controller 500 transmits a registration completion notification that the processing for registering the information of the image file in the blockchain is completed to the image capturing apparatus 102 (step S708).

After that, the blockchain registration process is terminated.

Figure 8:
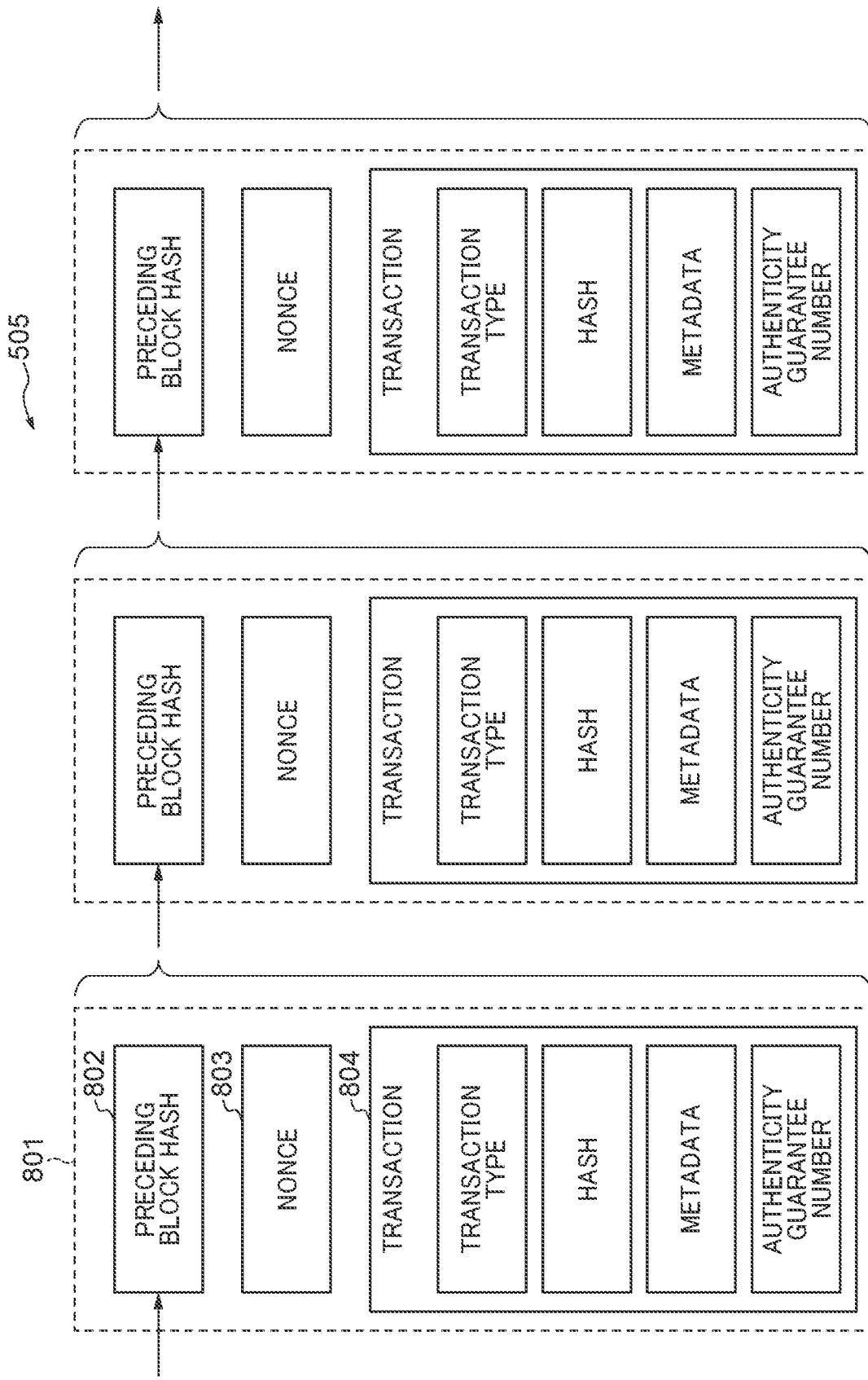
FIG. 8 is a diagram showing an example of a data structure of a blockchain managed by a blockchain management section appearing in FIG. 5.

FIG. 8 is a diagram showing an example of the block data structure of the blockchain managed by the blockchain management section 505 appearing in FIG. 5. As shown in FIG. 8, the blockchain is a database formed by connecting blocks like a chain along the time series. A block 801 connected to the blockchain includes a preceding block hash 802, a nonce 803, and transaction 804.

The preceding block hash 802 is a hash value of a block generated immediately before the block 801.

The nonce 803 is a nonce value used for mining.

The transaction 804 is the transaction data generated by the transaction generation section 503.

Figure 9:
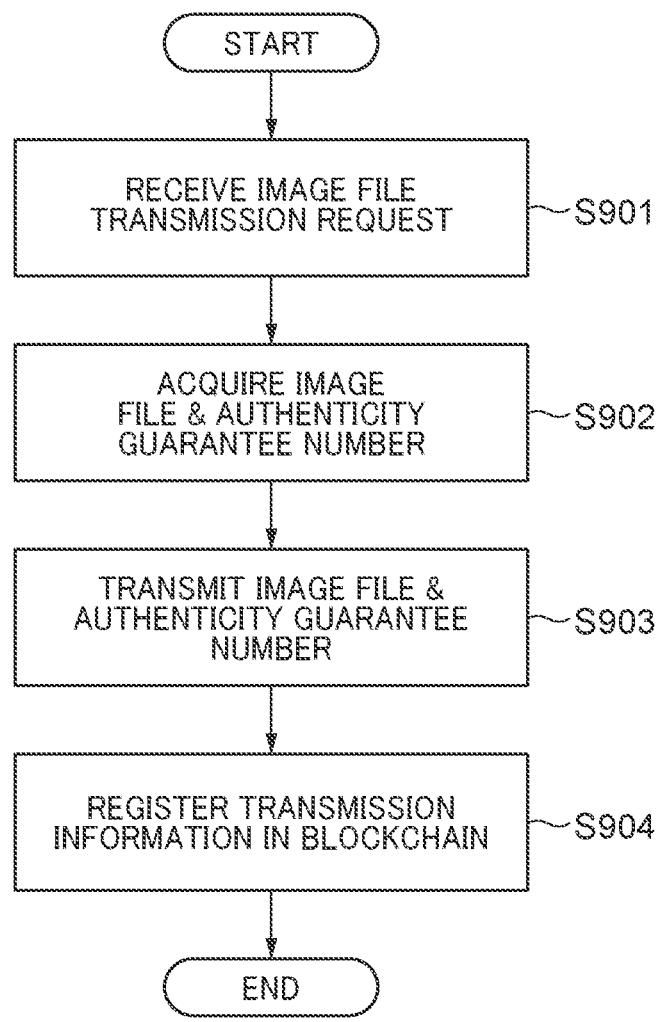
FIG. 9 is a flowchart of an image file transmitting process in FIG. 2, performed by the management system shown in FIG. 5, for transmitting an image file to a biometric information server.

FIG. 9 is a flowchart of an image file transmission process performed by the management system 101 shown in FIG. 5, for transmitting the image file to the biometric information server 103. The image file transmission process in FIG. 9 is also realized by the controller 500 that executes a program stored in the recording medium included in the computer forming the management system 101. The image file transmission process in FIG. 9 is executed when the user (such as a photographer) selects one of a plurality of image files registered in the database 506 and makes a request for transmitting the selected image file to the biometric information server 103 using the communication apparatus, not shown. This transmission request includes a block ID associated with the image file selected by the user in the database 506.

Referring to FIG. 9, first, the controller 500 receives the above-mentioned transmission request from the communication apparatus 105a operated by the user, via the data reception section 501 (step S901).

Then, the controller 500 acquires an image file as the target of the transmission request and the authenticity guarantee number of this image file from the database 506 (step S902). Specifically, the controller 500 acquires the image file and the authenticity guarantee number, associated with a block ID included in the transmission request, from the database 506.

Then, the controller 500 controls the data transmission section 502 to transmit the acquired image file and the authenticity guarantee number to the biometric information server 103 (step S903). The controller 500 notifies the communication apparatus 105a used by the user as the requesting source of the transmission request that the image file as the target of the transmission request has been registered in the biometric information server 103 at the same time.

Then, the controller 500 registers the transmission information of the image file in the blockchain (step S904). Specifically, first, the transaction generation section 503 generates transaction data including the authenticity guarantee number, the transmission information of the image file, the image data, and information indicating the transmission destination of the authenticity guarantee number (such as a URL). Next, the transaction generation section 503 broadcasts the transaction data to one or more computers (nodes) participating in the peer-to-peer network 104 of the blockchain. When the broadcasted transaction data is approved by miners to complete the verification, the block generation section 504 generates a block in which the verified transaction data has been written and connects the generated block to the blockchain. After that, the image file transmission process is terminated.

As described above, in the image file transmission process in FIG. 9, when an image file is transmitted from the management system 101 to the biometric information server 103 in response to a transmission request from a user, the management system 101 notifies the user that the image file has been registered in the biometric information server 103. The transmission information of the image file is registered in the blockchain at the same time. This enables the user to grasp a use status of the image file.

Figure 10:
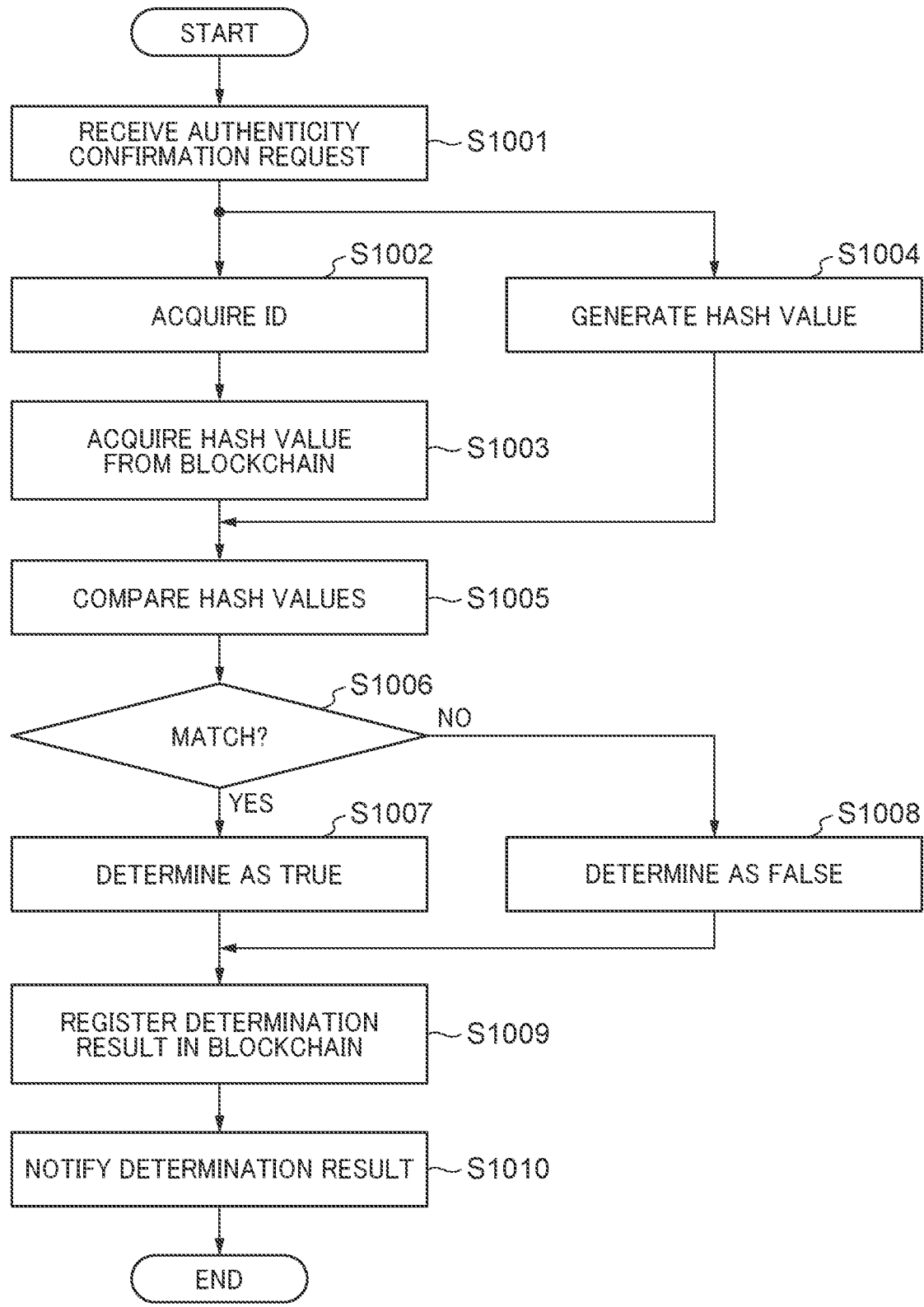
FIG. 10 is a flowchart of an authenticity determination process performed by the management system shown in FIG. 5.

FIG. 10 is a flowchart of an authenticity determination process performed by the management system 101 shown in FIG. 5. The authenticity determination process in FIG. 10 is also realized by the controller 500 that executes a program stored in the recording medium included in the computer forming the management system 101. Note that although in this example, the authenticity determination process in FIG. 10 is executed when a viewing user of the biometric information server 103 makes a request for confirming the authenticity of an image file displayed on the biometric information server 103 to the management system 101 by operating the communication apparatus 105b, this is not limitative.

Referring to FIG. 10, the controller 500 receives an authenticity confirmation request from the communication apparatus 105b operated by the viewing user, via the data reception section 501 (step S1001). When receiving this request, the controller 500 (second reception unit) also receives an image file as the target of the authenticity determination and an authenticity guarantee number associated with this image file, via the data reception section 501.

Then, the controller 500 (block ID acquisition section) inquires the database 506 by using the authenticity guarantee number received in the step S1001 as a key and thereby acquires a block ID associated with this authenticity guarantee number (step S1002).

Then, the controller 500 (hash value acquisition section) accesses a block corresponding to the acquired block ID in the blockchain and acquires a hash value stored in this block (step S1003).

Further, in parallel with the steps S1002 and S1003, the controller 500 controls the hash generation section 508 to apply the hash function to the image file received in the step S1001 (step S1004). With this, the controller 500 (third hash value generation section) generates (acquires) a hash value by the hash generation section 508. In doing this, the controller 500 accesses a block corresponding to the acquired block ID of the plurality of blocks forming the blockchain and acquires the hash value calculation detailed information stored in this block. In the step S1004, by referring to this hash value calculation detailed information, the hash value is generated by executing thinning processing on the image file and applying the hash function to the thinned image file.

When the steps S1002 to S1004 are completed, the controller 500 (comparison unit) controls the hash comparison section 509 to compare the image hash value acquired in the step S1003 and the hash value generated in the step S1004 (step S1005).

The controller 500 determines whether or not the two hash values compared in the step S1005 match (step S1006).

If it is determined in the step S1006 that the two hash values match, the controller 500 determines the image file as "true" indicating that the image file received in the step S1001 has not been altered (tampered) from the state at the time of generation thereof (step S1007). After that, the process proceeds to a step S1009.

On the other hand, if it is determined in the step S1006 that the two hash values do not match, the controller 500 determines the image file as "false" indicating that the image file received in the step S1001 has been altered from the state at the time of generation thereof (step S1008). After that, the process proceeds to the step S1009.

Then, the controller 500 controls the block generation section 504 to register the result of the determination in the step S1007 or S1008 in the blockchain (step S1009). Specifically, the block generation section 504 generates a block in which the result of the determination in the step S1007 or S1008 has been written and connects the generated block to the blockchain.

Then, the controller 500 (notification unit) controls the data transmission section 502 to notify the determination result to the communication apparatus 105b as the requesting source of the authenticity confirmation request (step S1010), followed by terminating the present process.

As described above, according to the present embodiment, the following process is executed in the management system 101: First, upon receipt of an image file and a hash value generated at the time of generation of the image file, an authenticity guarantee number for identifying the received image file is generated, and the received hash value is registered in the blockchain in a state associated with the authenticity guarantee number. Then, upon receipt of an authenticity confirmation request from a viewing user, a hash value generated based on the image file received together with the authenticity confirmation request and the hash value registered in the blockchain, which is associated with the authenticity guarantee number received together with the authenticity confirmation request, are compared. With this, in the management system 101, it is possible to easily determine the authenticity of the image file acquired by the viewing user.

Further, in the present embodiment, the image file received by the management system 101 together with the hash value from the image capturing apparatus 102 includes still image data or moving image data. That is, in the present embodiment, it is possible to easily determine the authenticity of the still image data or moving image data registered in the management system 101. Further, when applying the hash function to an image file, the image capturing apparatus 102 applies the hash function to the image data (binary data) included in the image file by thinning the image data (for example, in a case where the image data is moving image data, the hash function is applied to every other frame). This reduces the calculation load. Further, the information on this thinning processing (information indicating how to skip binary data of the image file) is also associated with the blockchain as the hash value calculation detailed information and is never altered, and hence the accuracy of the determination performed when executing the authenticity determination process on the image file is increased.

Note that the method of thinning frames used in a case where the image data is moving image data is not limited to a method of skipping every other frame, but may be a method of skipping every plurality of frames. For example, desired frames may be skipped or a frame may be skipped at desired frame intervals. Further, the information indicating the method of skipping frames is only required to be stored in the hash value calculation detailed information. Further, as for frames which are not skipped and left, thinning may be performed on a frame-by-frame basis, and the information indicating this method of thinning the moving image data may be also stored in the hash value calculation detailed information.

In the present embodiment, the management system 101 may be formed by at least a first computer that generates an authenticity guarantee number of an image file and a second computer that registers a hash value generated when the image file is generated in the blockchain in a state associated with the authenticity guarantee number.

Further, in the present embodiment, the management system 101 is formed by at least a plurality of computers (nodes) that register a hash value generated when the image file is generated, in the blockchain, in a state associated with the authenticity guarantee number. With this, in the configuration in which registration in the blockchain is performed by the plurality of computers, it is possible to easily determine the authenticity of the image file using the plurality of computers.

Further, in the present embodiment, in the management system 101, upon receipt of a request for transmitting an image file from the communication apparatus used by the user (image provider), the image file and the authenticity guarantee number of the image file are acquired from the database 506 and transmitted to the biometric information server 103. Further, on the biometric information server 103, the authenticity guarantee number provided from the management system 101 together with the image file is displayed on the WEB page e.g. near the image file. With this, the user (image provider) can provide the authenticity guarantee number to a viewing user together with the image file, via the biometric information server 103. Further, in a case where the viewing user desires to confirm the authenticity of the image file on the biometric information server 103, the viewing user is only required to operate the communication apparatus and transmit the image file and the authenticity guarantee number, which are acquired from the biometric information server 103, to the management system 101 together with an authenticity confirmation request. With this, a result of the determination of whether the image file is "true" or "false" is notified from the management system 101 to the communication apparatus, and hence the viewing user can easily determine the authenticity of this image file.

In the present embodiment, the management system 101 includes the hash generation section 508. With this, the management system 101 can determine, based on an image file transmitted from a user, the authenticity of the image file without forcing the communication apparatus used by the user who requests the authenticity confirmation to generate a hash value of the image file.

Incidentally, the facial appearance of a person changes depending on the time of photographing. Therefore, considering a case where image data of a person is used e.g. for a certificate, the management system 101 that manages image data of persons is required to control the validity of image data of each person based on time which has elapsed after the image data was registered.

To cope with this, in the present embodiment, a validity flag indicating the validity of image data is edited based on a validity start date, referred to hereinafter.

Figure 12:
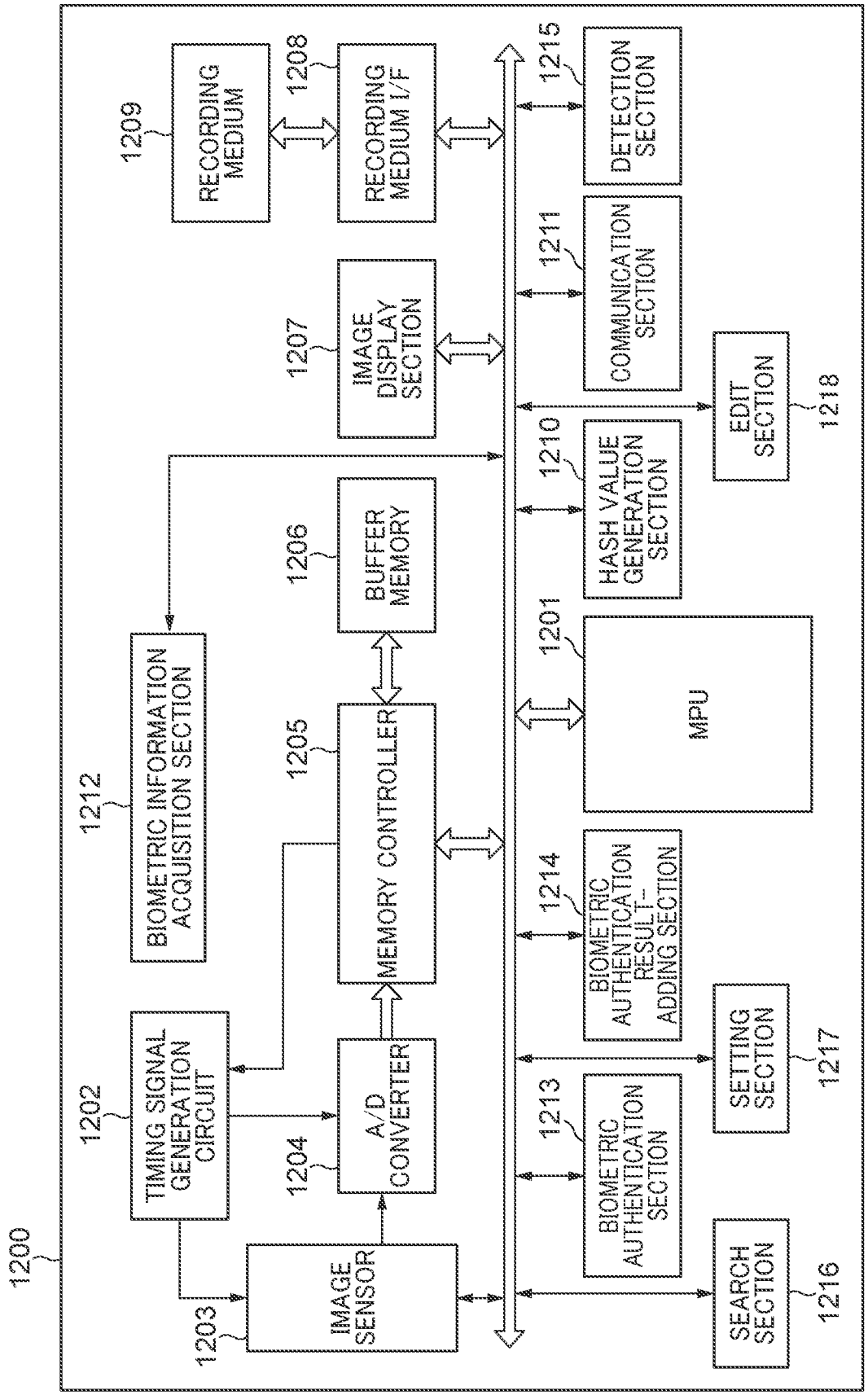
FIG. 12 is a schematic block diagram showing a hardware configuration of an image capturing apparatus according to a variation of the embodiment, that controls validity of image data generated by photographing a person.

FIG. 12 is a schematic block diagram showing a hardware configuration of an image capturing apparatus 1200 according to a variation of the embodiment, which controls validity of image data generated by photographing a person. The image capturing apparatus 1200 has a configuration similar to that of the above-described image capturing apparatus 102. Specifically, the image capturing apparatus 1200 includes an MPU 1201, a timing signal generation circuit 1202, an image sensor 1203, an analog-to-digital converter 1204, a memory controller 1205, and a buffer memory 1206, which are the same as the MPU 201, the timing signal generation circuit 202, the image sensor 203, the analog-to-digital converter 204, the memory controller 205, and the buffer memory 206, described above, respectively. Further, the image capturing apparatus 1200 includes an image display section 1207, a recording medium interface 1208, a recording medium 1209, a hash value generation section 1210, a communication section 1211, a biometric information acquisition section 1212, a biometric authentication section 1213, a biometric authentication result-adding section 1214, and a detection section 215, which are the same components as the image display section 207, the recording medium interface 208, the recording medium 209, the hash value generation section 210, the communication section 211, the biometric information acquisition section 212, the biometric authentication section 213, the biometric authentication result-adding section 214, and the detection section 215, as described above, respectively. The biometric information acquisition section 1212 is included in the image capturing apparatus 1200, in a state configured to be suitable to biometric information to be acquired. Further, the image capturing apparatus 1200 includes a search section 1216, a setting section 1217, and an edit section 1218.

The search section 1216 searches a database 1500, described hereinafter with reference to FIG. 15, which is managed by the management system 101, for image data of a person associated with biometric information acquired by the biometric information acquisition section 1212. The setting section 1217 sets a validity start date, the number of valid-set image data items, and an order of priority, for editing a validity flag indicating the validity of image data of a person associated with biometric information acquired by the biometric information acquisition section 1212. The edit section 1218 sets the validity flag of image data of a person associated with biometric information acquired by the biometric information acquisition section 1212 based on the validity start date, the number of valid-set image data items, and the order of priority, which are set by the setting section 1217. Note that although in the present invention, the description is given of a configuration in which the biometric authentication section 1213, the biometric authentication result-adding section 1214, the search section 1216, the setting section 1217, and the edit section 1218 are included in the image capturing apparatus 1200, by way of example, these components may be included in the management system 101.

Figure 13:
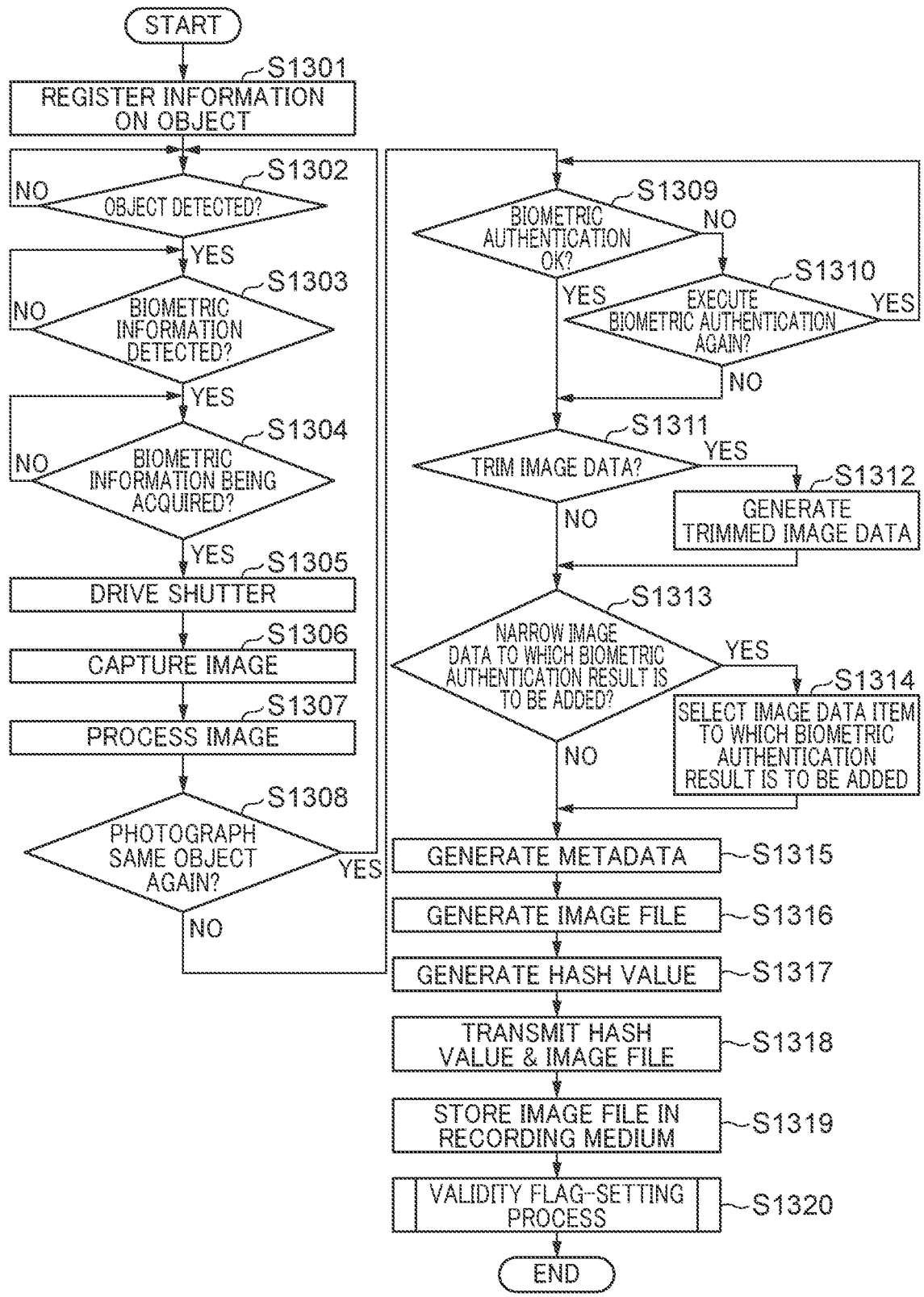
FIG. 13 is a flowchart of a data transmission process performed by the image capturing apparatus shown in FIG. 12.

FIG. 13 is a flowchart of a data transmission process performed by the image capturing apparatus 1200 shown in FIG. 12. Note that the data transmission process in FIG. 13 is a process similar to the above-described data transmission process in FIG. 3, and the following description is given mainly of different points from the above-described data transmission process in FIG. 3. The data transmission process in FIG. 13 is also realized by the MPU 1201 of the image capturing apparatus 1200, which executes a program stored e.g. in the recording medium 1209, similarly to the data transmission process in FIG. 3. Further, the data transmission process in FIG. 13 is also executed when the image capturing apparatus 1200 receives a photographing start operation performed by a photographer, such as an operation of pressing a photographing button of the image capturing apparatus 1200, similarly to the data transmission process in FIG. 3.

Referring to FIG. 13, steps S1301 to S1319 which are the same as the above-described steps S301 to S319 are executed. Then, the MPU 1201 performs a validity flag-setting process (step S1320).

Figure 14:
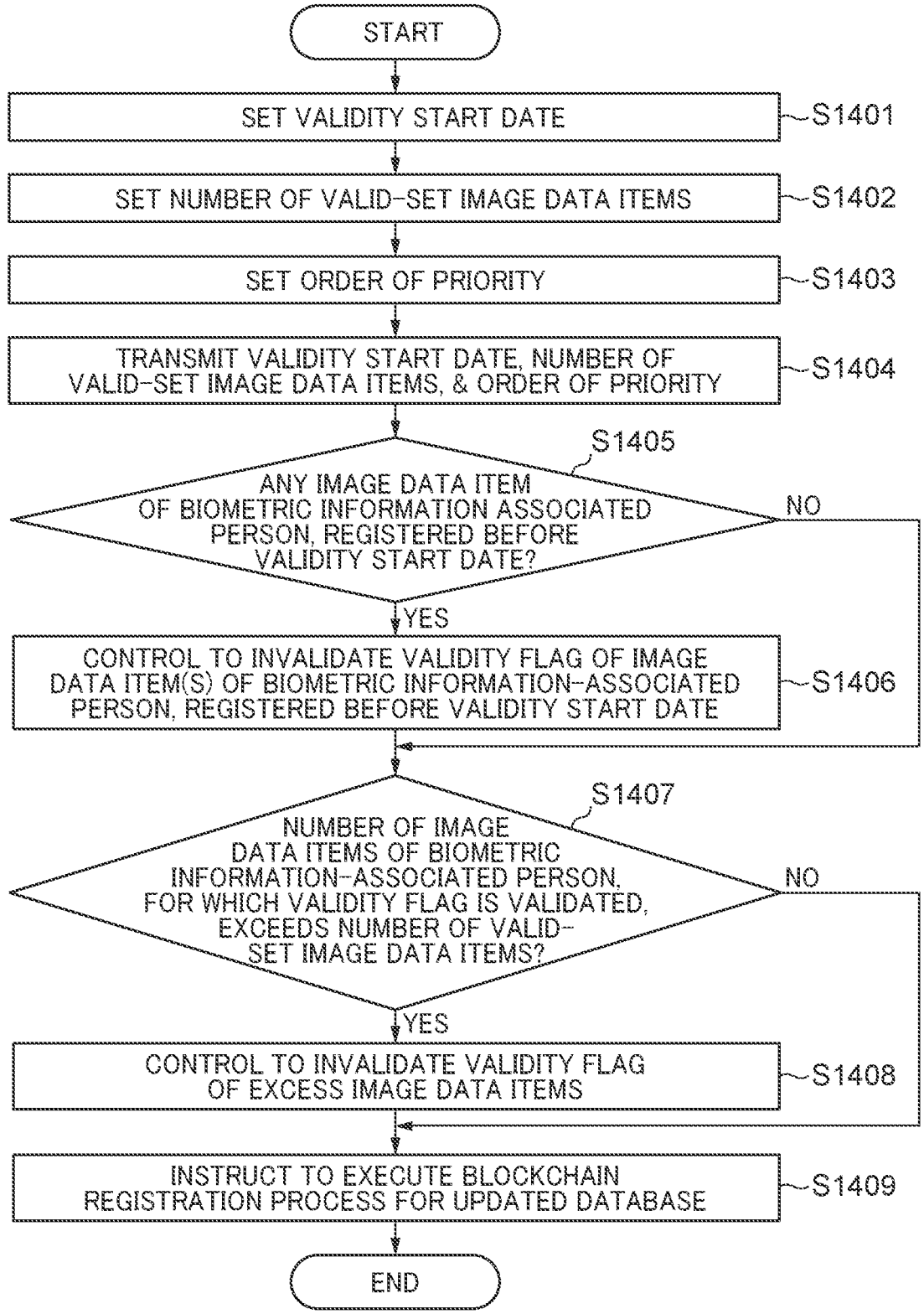
FIG. 14 is a flowchart of a validity flag-setting process performed in a step in FIG. 13.

FIG. 14 is a flowchart of the validity flag-setting process performed in the step S1320 in FIG. 13. Note that the management system 101 includes not the above-described database 506, but the database 1500 shown in FIG. 15 having a configuration similar to that of the database 506.

FIG. 15 is a diagram showing an example of the configuration of the database 1500 managed by the management system 101 appearing in FIG. 2. The database 1500 manages an ID 1501, a block ID 1502, image data 1503, biometric authentication result information 1504, an image acquisition date 1505, an image data size 1506, a validity flag 1507, and so forth in a state associated with one another. The ID 1501, the block ID 1502, the image data 1503, and the biometric authentication result information 1504 are the same as the ID 601, the block ID 602, the image data 603, and biometric authentication result information 604, described above, respectively.

In the image acquisition date 1505, a date is set on which the management system 101 acquired an image file e.g. from the image capturing apparatus 1200. In the image data size 1506, a data size of image data is set which is included in an image file acquired by the management system 101 e.g. from the image capturing apparatus 1200. In the validity flag 1507, valid or invalid is set based on the validity start date, the number of valid-set image data items, and the order of priority. Note that the configuration of the database 1500 is not limited to the above-described configuration, but the database 1500 may include any other items.

Note that in the validity flag-setting process in FIG. 14, it is assumed that the information items of the ID 0 to the ID 5 have been registered in the database 1500 as shown in FIG. 15, and that the validity flags of these information items are all set to "valid". The information items of the ID 0 to the ID 5 are information items of image data obtained by photographing the same person, i.e. photographing a person having the same biometric information acquired by the biometric information acquisition section 1212 at different times. The information items of the ID 0 and the ID 1 are information on an image file generated by the latest photographing, i.e. information on the image file transmitted from the image capturing apparatus 1200 to the management system 101 in the above-described step S1318. Further, the information items of the ID 2 to the ID 5 are information on image files generated by photographing performed before the latest photographing.

Referring to FIG. 14, first, the MPU 1201 sets the validity start date used as the reference for editing a validity flag of image data of a person associated with the biometric information acquired by the biometric information acquisition section 1212 in response to an input operation performed by the user (step S1401).

Then, the MPU 1201 sets the number of valid-set image data items, indicating the number of image data items whose validity flag is to be validated, according to an input operation performed by the user (step S1402). The number of valid-set image data items also includes the number of image data items included in the image file transmitted to the management system 101 in the step S1318, i.e. the number of image data items selected by the user in the step S1314. Therefore, as the number of valid-set image data items, at least the number is set which is not smaller than the number of image data items included in the image file transmitted to the management system 101 in the step S1318 (two in the present embodiment).

Then, the MPU 1201 sets the order of priority of image data items whose validity flag is to be validated according to an input operation performed by the user (step S1403). The order of priority can be set for all items as desired, according to an order of the sizes of image data items from the largest or an order of photographing time zones from the earliest based on Exchangeable image file format (Exif) information of image data. Further, it is possible to set a plurality of orders of priority, such as a first order of priority, a second order of priority, and a third order of priority.

Then, the MPU 1201 transmits the validity start date, the number of valid-set image data items, and the order of priority, which are set in the steps S1401 to S1403, respectively, to the management system 101 (step S1404).

Then, the MPU 1201 controls the search section 1216 to determine whether or not image data which is of a person associated with the biometric information acquired by the biometric information acquisition section 1212, and was registered before the validity start date set in the step S1401, exists in the database 1500 (step S1405). Note that the image data of a person associated with the biometric information acquired by the biometric information acquisition section 1212 is hereinafter referred to as the "image data of the biometric information-associated person".

If it is determined in the step S1405 that no image data of the biometric information-associated person, which was registered before the validity start date, exists, the validity flag-setting process proceeds to a step S1407 described hereinafter.

If it is determined in the step S1405 that image data of the biometric information-associated person, which was registered before the validity start date, exists, the MPU 1201 controls the edit section 1218 to edit the validity flag of the image data item(s) of the biometric information-associated person, which was (were) registered before the validity start date. Specifically, the MPU 1201 controls the edit section 1218 to invalidate the validity flag of the image data item(s) of the biometric information-associated person, which was (were) registered before the validity start date (step S1406). Here, a case where the validity start date is set to "Feb. 1, 2022" in the step S1401 will be described by way of example. In this case, the MPU 1201 controls the edit section 1218 to transmit an instruction for invalidating the validity flags of the ID 4 and the ID 5, each indicating the image data of the biometric information-associated person, which was registered in the database 1500 before the validity start date, to the management system 101. The management system 101 invalidates the validity flags of the ID 4 and the ID 5, which are registered in the database 1500. Association of each image data item for which the validity flag is invalidated with the biometric authentication result is made invalid, and the authenticity of the person existing in the image data item as the object is not guaranteed. That is, in the present embodiment, with respect to an image data item with the biometric authentication result information 1504 indicating "match" and the validity flag 1507 indicating "valid", the authenticity of the person existing in the image data item as the object is guaranteed, whereby the image data item can be used for the certificate only under the condition.

Then, the MPU 1201 controls the search section 1216 to determine whether or not the number of image data items of the biometric information-associated person, for which the validity flag is validated in the database 1500, is larger than the number of valid-set image data items (step S1407).

If it is determined in the step S1407 that the number of image data items of the biometric information-associated person, for which the validity flag is validated in the database 1500, is not larger than the number of valid-set image data items, the validity flag-setting process proceeds to a step S1409, described hereinafter.

It is determined in the step S1407 that the number of image data items of the biometric information-associated person, for which the validity flag is validated in the database 1500, is larger than the number of valid-set image data items. In this case, the MPU 1201 controls the edit section 1218 to edit the validity flag of each of image data items of the biometric information-associated person, which correspond to an excess over the number of valid-set image data items. Specifically, the MPU 1201 controls the edit section 1218 to perform control to invalidate the validity flag of each of image data items of the biometric information-associated person, which correspond to an excess over the number of valid-set image data items, according to the order of priority set in the step S1403 (step S1408).

Here, as an example of the case where the number of image data items of the biometric information-associated person, for which the validity flag is validated in the database 1500, exceeds the number of valid-set image data items, a case will be described where only the validity flags of the ID 4 and the ID 5 out of the ID 0 to the ID 5 are invalidated as described in the step S1406, and the number of valid-set image data items is set to "three" in the step S1402. Let it be assumed that the order of priority setting is set to "the order of image data sizes from the largest" in the step S1403. In this case, the validity flags of the ID 0 and the ID 1, registered in the above-described data transmission process in FIG. 13, are held valid, and the validity flag of one of the ID 2 and the ID 3 is invalidated. The MPU 1201 compares the image data size (9.2 MB) of the ID 2 and the image data size (5.6 MB) of the ID 3 based on the order of priority (the order of image data sizes from the largest). The MPU 1201 controls the edit section 1218 to transmit an instruction for invalidating the validity flag of the ID 3, which is the smaller in image data size, to the management system 101. In response to this instruction, the management system 101 invalidates the validity flag of the ID 3 registered in the database 1500.

Note that in a case where a plurality of orders of priority, such as the first order of priority, the second order of priority, and the third order of priority, are set, if there are a plurality of image data items which are in the same ranking in the first order of priority, these image data items are further ranked according to the second order of priority. If there are a plurality of image data items which are in the same ranking in the second order of priority, these image data items are further ranked according to the third order of priority. Thus, in the present embodiment, in a case where the number of valid-set image data items is set, the validity flag of each of image data items of the biometric information-associated person, which correspond to an excess over the number of valid-set image data items, is invalidated.

Then, the MPU 1201 causes the management system 101 to execute the blockchain registration process described above with reference to FIG. 7 for the updated database 1500 (step S1409). In the blockchain registration process, the validity flags included in the updated database 1500 are registered in the blockchain together with the image data items, the biometric authentication result, and so forth. To reduce the load of the database 1500, it is preferable that the information on the image data items whose validity flags are invalidated is deleted from the database 1500 after being registered in the blockchain. When the step S1409 is completed, the present process is terminated.

Thus, in the present embodiment, the validity flag indicating the validity of each image data item of a biometric information-associated person, which is associated with a hash value registered in the blockchain, is edited based on the set validity start date. With this, it is possible to control the validity of each image data item of a biometric information-associated person based on time elapsed after the registration.

Further, in the present embodiment, the validity flag is edited based on the set validity start date and the number of valid-set image data items. With this, it is possible to control the validity of each image data item of a biometric information-associated person based not only on time elapsed after the registration, but also on the number of image data items.

Note that in the present embodiment, the information set in the steps S1401, S1402, and S1403 may be set not by the image capturing apparatus 1200, but by a desired external input device or set by the management system 101 in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-194155, filed Dec. 5, 2022, and Japanese Patent Application No. 2023-176068, filed Oct. 11, 2023, which are hereby incorporated by reference herein in their entirety.

What is claimed is:

1. An image capturing apparatus, comprising:
one or more processors; and
a memory coupled to the one or more processors and storing instructions that, when executed by the one or more processors, cause the one or more processors to perform operations comprising:
   capturing an image of an object to generate an image data item;
   detecting biometric information of the object;
   acquiring a biometric authentication result indicating whether or not the detected biometric information matches registered biometric information registered in advance;
   generating a hash value from the image data item when the biometric authentication result indicates that the detected biometric information and the registered biometric information match;
   recording the hash value and the image data item in a recording medium;
   transmitting the hash value and the image data item to an external apparatus that performs processing for registering the hash value in a blockchain;
   setting a validity start date of the image data item including the object associated with the detected biometric information; and
   editing a validity flag indicating validity of the image data item which is associated with the hash value registered in the blockchain and includes the object associated with the detected biometric information, based on the validity start date,
   wherein when the image of the object is captured, the biometric information of the object is detected.

2. The image capturing apparatus according to claim 1, wherein the operations further comprise recording the biometric authentication result in the recording medium.

3. The image capturing apparatus according to claim 2, wherein the biometric authentication result is recorded in a state added to the image data item, and the operations further selecting, when a plurality of image data items are generated by capturing images of the object, at least one image data item to which the biometric authentication result is to be added, from the plurality of image data items.

4. The image capturing apparatus according to claim 1, wherein the operations further comprise generating a trimmed image by trimming the image data item, and
wherein the hash value is generated from the trimmed image.

5. The image capturing apparatus according to claim 1, wherein the biometric information of the object is detected based on data acquired from a plurality of acquisitions that acquire different types of biometric information, respectively.

6. The image capturing apparatus according to claim 1, wherein the biometric information is information associated with at least one of an iris, a fingerprint, and a vocal cord of the object.

7. The image capturing apparatus according to claim 1, wherein the operations further comprise transmitting the detected biometric information to an external authentication apparatus, and
wherein the biometric authentication result is acquired from the authentication apparatus.

8. The image capturing apparatus according to claim 1, wherein the operations further comprise setting a number of valid-set image data items, which indicates a number of image data items for which the validity flag is to be validated, and wherein the validity flag is edited based on the validity start date and the number of valid-set image data items.

9. The image capturing apparatus according to claim 8, wherein the operations further comprise setting an order of priority for determining an image data item for which the validity flag is to be validated, and
wherein the validity flag is edited based on the validity start date, the number of valid-set image data items, and the order of priority.

10. A system comprising a management system that is connected to an image capturing apparatus and a network of a blockchain,
the image capturing apparatus including:
one or more processors; and
a memory coupled to the one or more processors and storing instructions that, when executed by the one or more processors, cause the one or more processors to perform:
capturing an image of an object to generate an image data item,
detecting biometric information of the object,
acquiring a biometric authentication result indicating whether or not the detected biometric information matches registered biometric information registered in advance,
generating a hash value from the image data item when the biometric authentication result indicates that the detected biometric information and the registered biometric information match,
transmitting the hash value and the image data item to the management system that performs processing for registering the hash value in the blockchain,
setting a validity start date of the image data item including the object associated with the detected biometric information, and
editing a validity flag indicating validity of the image data item which is associated with the hash value registered in the blockchain and includes the object associated with the detected biometric information, based on the validity start date,
wherein when the image of the object is captured, the biometric information of the object is detected, and
the management system comprising:
one or more processors; and
a memory coupled to the one or more processors and storing instructions that, when executed by the one or more processors, cause the one or more processors to perform operations comprising:
receiving the hash value and the image data item; and
registering the hash value in the blockchain.

11. The system according to claim 10, wherein the operations further comprise the management system generating a second hash value from the received image data item, and when the received hash value and the generated second hash value match, registering the hash value of the image data item in the blockchain.

12. The system according to claim 11, wherein the operations further comprise the management system:
generating an authenticity guarantee number of the image data item,
issuing a block ID associated with a block via which the hash value is registered in the blockchain, and
managing the image data item in a state associated with the authenticity guarantee number and the block ID.

13. The system according to claim 12, wherein the operations further comprising the management system:
receiving an image data item and an authenticity guarantee number from a user terminal,
acquiring a block ID associated with the authenticity guarantee number,
accessing a block associated with the acquired block ID, in the blockchain, to acquire the hash value,
generating a third hash value from the received image data item,
comparing the third hash value generated by the third hash value generation section and the acquired hash value acquired by the hash value acquisition section, and
notifying the user terminal of a result of the comparison.

14. The system according to claim 12, wherein the image capturing apparatus further transmits the biometric authentication result to the management system, and
wherein the biometric authentication result is managed in a state associated with the image data item.

15. The system according to claim 10, wherein the operations further comprise the image capturing apparatus setting a number of valid-set image data items, which indicates a number of image data items for which the validity flag is to be validated, and
wherein the validity flag is edited based on the validity start date and the number of valid-set image data items.

16. The system according to claim 15, wherein the operations further comprise the image capturing apparatus setting an order of priority for determining an image data item for which the validity flag is to be validated, and
wherein the validity flag is edited based on the validity start date, the number of valid-set image data items, and the order of priority.

17. A method of controlling an image capturing apparatus that captures an image of an object to generate an image data item, comprising:
detecting biometric information of the object;
acquiring a biometric authentication result indicating whether or not the detected biometric information matches registered biometric information registered in advance;
generating a hash value from the image data item when the biometric authentication result indicates that the detected biometric information and the registered biometric information match;
transmitting the hash value and the image data item to an external apparatus that performs processing for registering the hash value in a blockchain;
setting a validity start date of the image data item including the object associated with the detected biometric information; and
editing a validity flag indicating validity of the image data item which is associated with the hash value registered in the blockchain and includes the object associated with the detected biometric information, based on the validity start date,
wherein when the image of the object is captured, the biometric information of the object is detected.

18. A method of controlling a system comprising a management system that is connected to an image capturing apparatus and a network of a blockchain, the method comprising:
by the image capturing apparatus:
capturing an image of an object to generate an image data item,
detecting biometric information of the object,
acquiring a biometric authentication result indicating whether or not the detected biometric information matches registered biometric information registered in advance,
generating a hash value from the image data item when the biometric authentication result indicates that the detected biometric information and the registered biometric information match,
transmitting the hash value and the image data item to the management system that performs processing for registering the hash value in the blockchain,
setting a validity start date of the image data item including the object associated with the detected biometric information, and
editing a validity flag indicating validity of the image data item which is associated with the hash value registered in the blockchain and includes the object associated with the detected biometric information, based on the validity start date,
wherein when the image of the object is captured, the biometric information of the object is detected, and
the method further comprising, by the management system:
receiving the hash value and the image data item; and
registering the hash value in the blockchain.

19. A non-transitory computer-readable storage medium storing a program for causing a computer to execute a method of controlling an image capturing apparatus,
wherein the method comprises:
capturing an image of an object to generate an image data item;
detecting biometric information of the object;
acquiring a biometric authentication result indicating whether or not the detected biometric information matches registered biometric information registered in advance;
generating a hash value from the image data item when the biometric authentication result indicates that the detected biometric information and the registered biometric information match;

transmitting the hash value and the image data item to an external apparatus that performs processing for registering the hash value in a blockchain;
setting a validity start date of the image data item including the object associated with the detected biometric information; and
editing a validity flag indicating validity of the image data item which is associated with the hash value registered in the blockchain and includes the object associated with the detected biometric information, based on the validity start date,
wherein when the image of the object is captured, the biometric information of the object is detected.

20. A non-transitory computer-readable storage medium storing a program for causing a computer to execute of controlling a system comprising a management system that is connected to an image capturing apparatus and a network of a blockchain,
wherein the program comprises code that, when executed, causes the image capturing apparatus to:
capture an image of an object to generate an image data item,
detect biometric information of the object,
acquire a biometric authentication result indicating whether or not the detected biometric information matches registered biometric information registered in advance,
generate a hash value from the image data item when the biometric authentication result indicates that the detected biometric information and the registered biometric information match,
transmit the hash value and the image data item to the management system that performs processing for registering the hash value in the blockchain,
set a validity start date of the image data item including the object associated with the detected biometric information, and
edit a validity flag indicating validity of the image data item which is associated with the hash value registered in the blockchain and includes the object associated with the detected biometric information, based on the validity start date,
wherein when the image of the object is captured, biometric information of the object is detected,
wherein the code, when executed, further causes the management system to:
receive the hash value and the image data item; and
register the hash value in the blockchain.

* * * * *